US012554582B2

(12) United States Patent
Suzuki et al.

(10) Patent No.: US 12,554,582 B2
(45) Date of Patent: Feb. 17, 2026

(54) MEMORY SYSTEM

(71) Applicant: Kioxia Corporation, Tokyo (JP)

(72) Inventors: Riki Suzuki, Yokohama Kanagawa (JP); Toshikatsu Hida, Yokohama Kanagawa (JP); Yoshihisa Kojima, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 36 days.

(21) Appl. No.: 18/590,217

(22) Filed: Feb. 28, 2024

(65) Prior Publication Data

US 2024/0320097 A1 Sep. 26, 2024

(30) Foreign Application Priority Data

Mar. 20, 2023 (JP) ................................. 2023-044616

(51) Int. Cl.
*G06F 11/14* (2006.01)
*G06F 11/10* (2006.01)

(52) U.S. Cl.
CPC ........ *G06F 11/141* (2013.01); *G06F 11/1048* (2013.01); *G06F 11/1068* (2013.01)

(58) Field of Classification Search
None
See application file for complete search history.

(56) References Cited

U.S. PATENT DOCUMENTS 10,509,583 B1 * 12/2019 Hsiao .................... G06F 3/0616
11,237,908 B2    2/2022 Hwang et al.
2013/0185612 A1 * 7/2013 Lee ........................ G11C 16/26
                                                          714/799
2014/0281770 A1 * 9/2014 Kim ....................... G11C 29/42
                                                          714/721
2019/0361778 A1 * 11/2019 Kim .................... G11C 16/3431
2020/0160906 A1 *  5/2020 Lee ........................ G06F 11/141
2020/0192759 A1    6/2020 Hwang et al.
2020/0201726 A1 *  6/2020 Lee ..................... G06F 11/1012
2020/0225876 A1 *  7/2020 Du ......................... G06F 11/073
2021/0026718 A1 *  1/2021 Huang .................. G06F 11/076
2021/0216472 A1 *  7/2021 Ueda ................... G06F 11/3089
2021/0279000 A1 *  9/2021 Cho ....................... G06F 3/0679

(Continued)

OTHER PUBLICATIONS

Y. Cai, S. Ghose, E. F. Haratsch, Y. Luo and O. Mutlu, "Error Characterization, Mitigation, and Recovery in Flash-Memory-Based Solid-State Drives," in Proceedings of the IEEE, vol. 105, No. 9, pp. 1666-1704, Sep. 2017, (Year: 2017).*

*Primary Examiner* — Daniel F. McMahon
(74) *Attorney, Agent, or Firm* — Foley & Lardner LLP

(57) ABSTRACT

A memory controller can select a first read retry process having a first average required time when reliability of a target area of a nonvolatile memory on which a read process is to be executed satisfies a criteria, the first read retry process including a shift read operation. The memory controller can select a second read retry process having a second average required time that is longer than the first average required time when the reliability of the target area does not satisfy the criteria, the second read retry processes including a tracking operation that is executed before any one of the plurality of read operations of the shift read operation. The memory controller can execute the selected read retry process.

17 Claims, 23 Drawing Sheets

(56) References Cited

U.S. PATENT DOCUMENTS

| | | |
|---|---|---|
| 2021/0357289 A1 | 11/2021 | Kurose et al. |
| 2022/0115084 A1 | 4/2022 | Xu et al. |
| 2022/0121520 A1 | 4/2022 | Hwang et al. |
| 2024/0029787 A1* | 1/2024 | Son .................. G11C 16/349 |
| 2024/0160357 A1* | 5/2024 | Jang .................. G06F 3/0659 |
| 2024/0168651 A1* | 5/2024 | Huang ................ G06F 3/0679 |

* cited by examiner

FIG. 5

| HISTORY VALUE SHARING UNIT IDENTIFIER | STATE |
|---|---|
| HVSU1 | Outfield |
| HVSU2 | Infield |
| HVSU3 | Outfield |
| HVSU4 | Infield |
| HVSU5 | Outfield |
| HVSU6 | Infield |
| ... | |

FIG. 6

| HISTORY VALUE SHARING UNIT IDENTIFIER | HISTORY VALUE |
|---|---|
| HVSU1 | Vth1 |
| HVSU2 | Index#3 |
| HVSU3 | Vth3 |
| HVSU4 | Index#4 |
| HVSU5 | Vth5 |
| HVSU6 | Index#2 |
| ... | |

FIG. 9

| SHIFT INDEX | SHIFT READ CONDITION |
|---|---|
| 0 | $V_0, \Delta V_0$ |
| 1 | $V_1, \Delta V_1$ |
| 2 | $V_2, \Delta V_2$ |
| 3 | $V_3, \Delta V_3$ |
| 4 | $V_4, \Delta V_4$ |

FIG. 13

| HISTORY VALUE SHARING UNIT IDENTIFIER | HISTORY VALUE |
|---|---|
| HVSU1 | Index#10 |
| HVSU2 | Index#3 |
| HVSU3 | Index#12 |
| HVSU4 | Index#4 |
| HVSU5 | Index#11 |
| HVSU6 | Index#2 |
| ... | |

FIG. 14

| SHIFT INDEX | SHIFT READ CONDITION |
|---|---|
| 10 | $V_{10}, \Delta V_{10}$ |
| 11 | $V_{11}, \Delta V_{11}$ |
| 12 | $V_{12}, \Delta V_{12}$ |
| 13 | $V_{13}, \Delta V_{13}$ |

FIG. 16

| HISTORY VALUE SHARING UNIT IDENTIFIER | HISTORY VALUE |
|---|---|
| HVSU1 | Vth1 |
| HVSU2 | Index#3 |
| HVSU3 | Index#12 |
| HVSU4 | Index#4 |
| HVSU5 | Index#11 |
| HVSU6 | Index#2 |
| ... | |

FIG. 22

| BLOCK IDENTIFIER | STATE |
|---|---|
| SBLK1 | ACTIVE |
| SBLK2 | NON-ACTIVE |
| SBLK3 | NON-ACTIVE |
| SBLK4 | ACTIVE |
| SBLK5 | ACTIVE |
| SBLK6 | ACTIVE |
| ... | |

INITIAL STATE: PERFORM

STATE AFTER UPDATE: PERFORM Skip PERFORM Skip PERFORM Skip

☐ : HISTORY VALUE SHARING UNIT WHICH IS OUTFIELD STATE

▨ : HISTORY VALUE SHARING UNIT WHICH IS INFIELD STATE OR NON-ACTIVE STATE

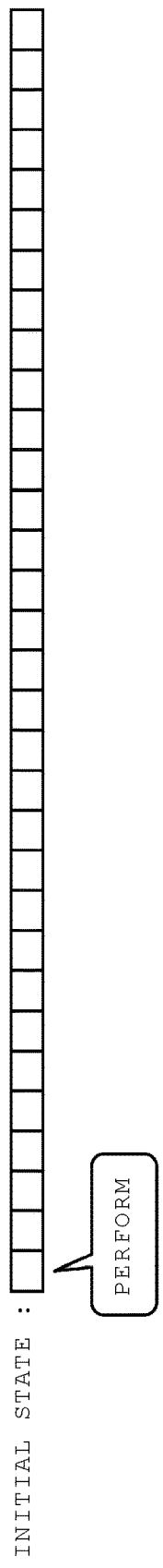
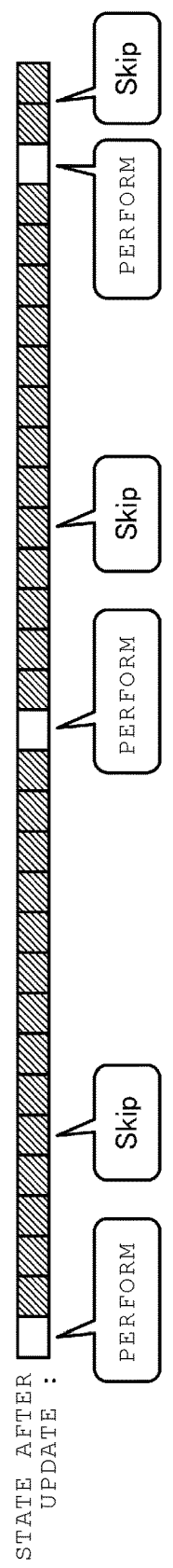
FIG. 25A
FIG. 25B

MEMORY SYSTEM

CROSS-REFERENCE TO RELATED APPLICATION

This application is based upon and claims the benefit of priority from Japanese Patent Application No. 2023-044616, filed Mar. 20, 2023, the entire contents of which are incorporated herein by reference.

FIELD

Embodiments described herein relate generally to a memory system.

BACKGROUND

A memory system having a nonvolatile memory reads data from the nonvolatile memory according to a read request when the read request is received from a host. In the memory system, it is desired that data can be appropriately read from the nonvolatile memory.

DESCRIPTION OF THE DRAWINGS

FIG. 5 is a diagram illustrating history value sharing management information according to the first embodiment.

FIG. 6 is a diagram illustrating history value management information according to the first embodiment.

FIG. 9 is a diagram illustrating a shift table for the infield process according to the first embodiment.

FIG. 13 is a diagram illustrating history value management information according to the third embodiment.

FIG. 14 is a diagram illustrating a shift table for the outfield process according to the third embodiment.

FIG. 16 is a diagram illustrating history value management information according to the fourth embodiment.

FIG. 22 is a diagram illustrating block management information according to the ninth embodiment.

FIGS. 25A and 25B are diagrams illustrating an operation of the memory system according to the tenth embodiment.

DETAILED DESCRIPTION

Embodiments provide a memory system that can appropriately read data from the nonvolatile memory.

In general, according to one embodiment, a memory system includes a nonvolatile memory; and a controller configured to (i) select one of a plurality of read retry processes having different average required times, respectively, based on reliability of a target area of the nonvolatile memory on which a read process is to be executed and (ii) execute the selected read retry process.

A memory system according to some embodiments is described in detail below with reference to the accompanying drawings. The present disclosure is not limited to these embodiments.

First Embodiment

A memory system according to a first embodiment includes a nonvolatile memory. When receiving a read command from a host, the memory system reads data from the nonvolatile memory according to the read command. In the memory system according to the present embodiment, measures for appropriately reading data from the nonvolatile memory are taken.

Figure 1:
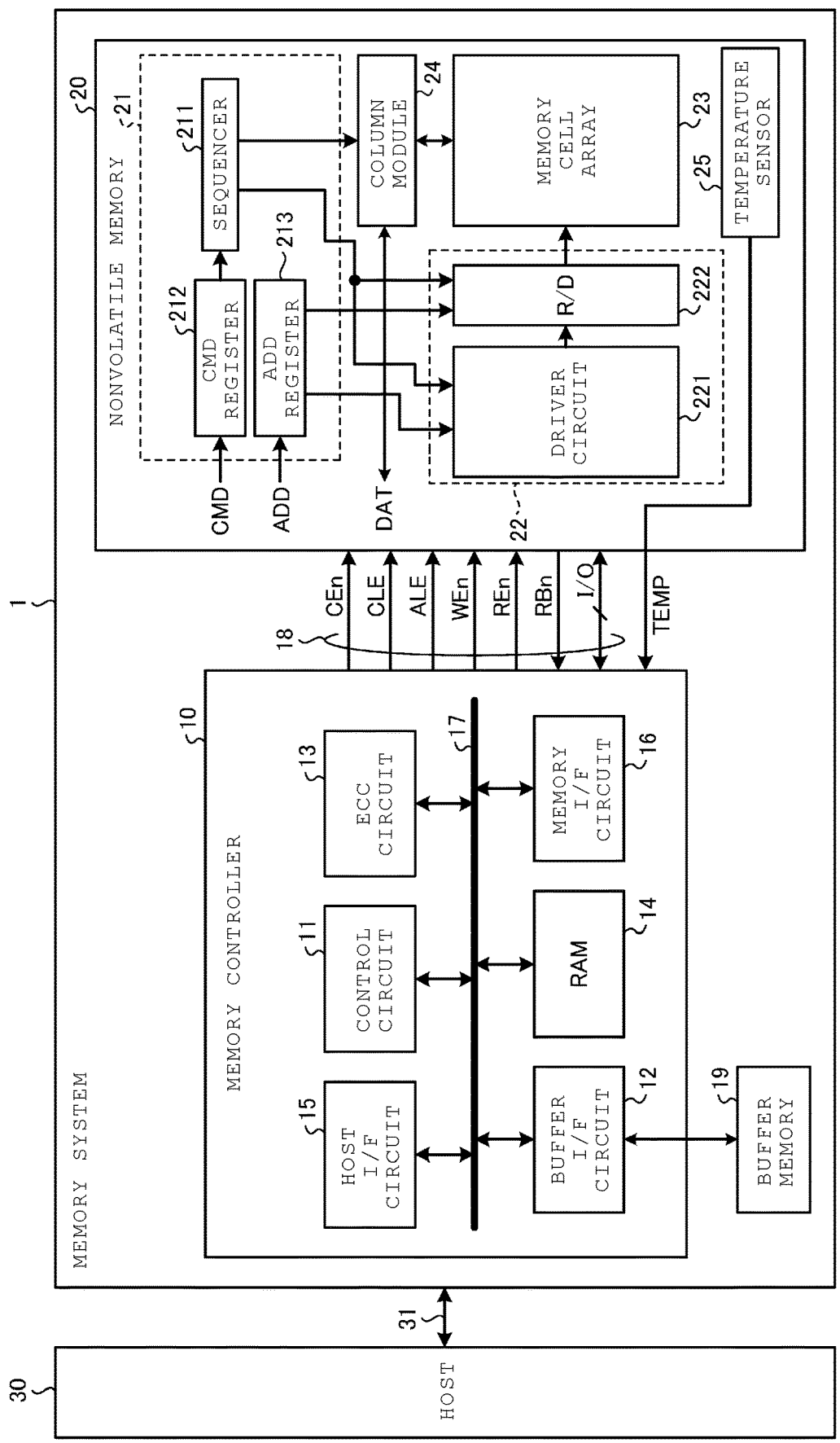
FIG. 1 is a block diagram illustrating a configuration of a memory system according to a first embodiment.

A memory system 1 is configured as illustrated in FIG. 1. FIG. 1 is a diagram illustrating a configuration of the memory system 1.

The memory system 1 includes a nonvolatile memory 20, a memory controller 10, and a buffer memory 19. The memory system 1 is connectable to a host 30. In FIG. 1, the memory system 1 is illustrated in a state of being connected to the host 30. The host 30 may be, for example, an electronic device such as a personal computer, a server device, a mobile terminal, or a digital still camera.

The memory system 1 may be various memory systems including the nonvolatile memory 20, such as a solid state drive (SSD) or a memory card in which the memory controller 10 and the nonvolatile memory 20 are configured as one package.

The nonvolatile memory 20 is a memory that stores data in a nonvolatile manner. The nonvolatile memory 20 is, for example, a NAND flash memory. The nonvolatile memory 20 may be configured with a plurality of memory chips. In the following description, a case where a NAND flash memory is used as the nonvolatile memory 20 is exemplified. As the nonvolatile memory 20, a two-dimensional structure flash memory, a three-dimensional structure flash memory, a resistive random access memory (ReRAM), a ferroelectric random access memory (FeRAM), and a magnetoresistive random access memory (MRAM) may be used. Also, it is not essential that the nonvolatile memory 20 is a semiconductor memory. It is also possible to apply the present embodiment to various storage media other than semiconductor memory.

The memory controller 10 is, for example, a semiconductor integrated circuit configured as a system-on-a-chip (SoC). A part or all of the functions of each component of the memory controller 10 described below may be implemented with a central processing unit (CPU) executing firmware or may be implemented with dedicated hardware.

The memory controller 10 can be connected to the host 30 via a host bus 31. The memory controller 10 controls a write process to the nonvolatile memory 20 according to a write request from the host 30. Also, the memory controller 10 controls a read process from the nonvolatile memory 20 according to a read request from the host 30. Examples of standards that the host bus 31 complies with include Serial Advanced Technology Attachment (SATA), Serial Attached SCSI (SAS), and Peripheral Component Interconnect express (PCIe) (registered trademark).

The memory controller 10 is connected to the nonvolatile memory 20 via a memory bus 18. When the nonvolatile memory 20 includes a plurality of memory chips, the memory controller 10 may be connected to the plurality of memory chips via a plurality of memory buses 18. The memory bus 18 is also referred to as a channel. The memory bus 18 is used for transmission and reception of signal between the memory controller 10 and the nonvolatile memory 20. Specific examples of the signal include a chip enable signal CEn, a command latch enable signal CLE, an address latch enable signal ALE, a write enable signal WEn, a read enable signal REn, a ready/busy signal RBn, and an input/output signal I/O.

The signal CEn is a signal for enabling a memory chip in the nonvolatile memory 20. The signal CLE is a signal for notifying the nonvolatile memory 20 that the input signal I/O to the nonvolatile memory 20 is a command. The signal ALE is a signal for notifying the nonvolatile memory 20 that the input signal I/O to the nonvolatile memory 20 is an address. The signal WEn is a signal for taking the input signal I/O into the nonvolatile memory 20. The signal REn is a signal for reading the output signal I/O from the nonvolatile memory 20. The ready/busy signal RBn is a signal for indicating whether the nonvolatile memory 20 is in a ready state or a busy state. The ready state is a state in which the nonvolatile memory 20 can receive a command from the memory controller 10. The busy state is a state in which the nonvolatile memory 20 cannot receive a command from the memory controller 10. The input/output signal I/O is, for example, an 8-bit signal. The input/output signal I/O is an entity of data transmitted and received between the nonvolatile memory 20 and the memory controller 10. The input/output signal I/O includes a command, an address, write data (data to be written), read data (data that is read), and a status.

A signal TEMP indicating temperature of the nonvolatile memory 20 measured by a temperature sensor 25 is also input from the nonvolatile memory 20 to the memory controller 10. As illustrated in FIG. 1, the temperature sensor 25 may be provided in the nonvolatile memory 20. The temperature sensor 25 may be provided outside the nonvolatile memory 20. A signal line for transmitting the signal TEMP output from the temperature sensor 25 may be provided in the memory bus 18 or may be another signal line independent from the memory bus 18.

The memory controller 10 includes a host interface (host I/F) circuit 15, a control circuit 11, a buffer interface (buffer I/F) circuit 12, a random access memory (RAM) 14, a memory interface (memory I/F) circuit 16, and an error correction code (ECC) circuit 13. The host I/F circuit 15, the control circuit 11, the buffer I/F circuit 12, the RAM 14, the memory I/F circuit 16, and the ECC circuit 13 are connected to each other via an internal bus 17.

The host I/F circuit 15 may be connected to the host 30 via the host bus 31. The host I/F circuit 15 transmits a command and data received from the host 30 to the control circuit 11 and the RAM 14 or the buffer memory 19, respectively. Also, the host I/F circuit 15 transmits data in the RAM 14 or the buffer memory 19 to the host 30 in response to a request from the control circuit 11.

The control circuit 11 is configured, for example, with a central processing unit (CPU). The control circuit 11 comprehensively controls an operation of each unit of the memory controller 10. For example, when receiving a write request from the host 30, the control circuit 11 issues a write command to the memory I/F circuit 16 for instructing the memory I/F circuit 16 to perform a write process of data to the nonvolatile memory 20. When receiving a read request from the host 30, the control circuit 11 issues a read command to the memory I/F circuit 16 for instructing the memory I/F circuit 16 to perform a read process of data from the nonvolatile memory 20. Also, the control circuit 11 issues an erase command to the memory I/F circuit 16 as part of a process of garbage collection (also referred to as compaction). In addition to the garbage collection, the control circuit 11 controls execution of various internal processes for managing the nonvolatile memory 20. The internal process includes, for example, wear leveling, refresh, and patrol read.

When receiving the write request from the host 30, the control circuit 11 determines a storage area on the nonvolatile memory 20 where user data is to be stored. The correspondence between a logical address of user data and a physical address indicating a storage area on the nonvolatile memory 20 where the corresponding user data is stored is managed by using address conversion information. The address conversion information may be referred to as a look-up table (LUT). This address conversion information is stored, for example, in the nonvolatile memory 20, is read, if necessary, and is cached in the RAM 14 and/or the buffer memory 19. The address conversion information may be updated according to requests (for example, a write request, a trim request, and a format request) from the host 30 or internally issued process requests (for example, garbage collection request, and refresh request).

When receiving a read request from the host 30, the control circuit 11 converts a logical address designated by the read request to a physical address by using the above-described address conversion information, issues a read command for instructing the read process from the corresponding physical address, and supplies the read command to the memory I/F circuit 16.

The memory I/F circuit 16 is connected to the nonvolatile memory 20 via the memory bus 18. The memory I/F circuit 16 controls communication with the nonvolatile memory 20. The memory I/F circuit 16 outputs the signal CEn, the signal ALE, the signal CLE, the signal WEn, and the signal REn to the nonvolatile memory 20 based on the read command received from the control circuit 11. In the read process, the memory I/F circuit 16 transmits the read command issued by the control circuit 11 to the nonvolatile memory 20 as the input/output signal I/O. Also, the memory I/F circuit 16 receives data read from the nonvolatile memory 20 as the input/output signal I/O. The memory I/F circuit 16 transmits the received data into the RAM 14 or the buffer memory 19. In the write process, the memory I/F circuit 16 transmits a write command issued by the control circuit 11 and data in the RAM 14 or the buffer memory 19 to the nonvolatile memory 20 as the input/output signal I/O.

The buffer memory 19 temporarily stores data to be written to the nonvolatile memory 20 or data read from the nonvolatile memory 20. The buffer memory 19 has a memory capacitance larger than that of the RAM 14. The buffer memory 19 may be configured with a dynamic random access memory (DRAM), a static random access memory (SRAM), and the like.

The buffer I/F circuit 12 is a controller for controlling an access from the memory controller 10 to the buffer memory 19. The buffer I/F circuit 12 enables an access to the buffer memory 19, for example, at a double data rate (DDR).

The RAM 14 stores the address conversion information and various management tables. These information is read from a specific area of the nonvolatile memory 20 during start-up of the memory system 1. Also, the RAM 14 may be used as a working memory that temporarily stores snapshots of various management tables and/or log information that is change differences in the various management tables. Further, the RAM 14 can also be used as a cache memory when transferring data between the host 30 and the nonvolatile memory 20. The RAM 14 may be configured with a dynamic random access memory (DRAM), a static random access memory (SRAM), and the like.

The ECC circuit 13 encodes and decodes data for an error detection process an and error correction process. Specifically, the ECC circuit 13 encodes user data to be written to the nonvolatile memory 20 and generates write data (that is, a code word). Also, the ECC circuit 13 can decode data (that is, a code word) read from the nonvolatile memory 20 and restore user data. By the decoding, the ECC circuit 13 executes the error detection process and the error correction process on the read data. When the error correction process fails, the ECC circuit 13 notifies the control circuit 11 of the failure of the error correction process. When an error correction process is successful, the ECC circuit 13 can restore user data. As the encoding and decoding algorithm by the ECC circuit 13, any algorithm including, for example, a Reed-Solomon (RS) code, a Bose-Chaudhuri-Hocquenghem (BCH) code, or a low-density parity check (LDPC) code may be applied.

In the write process, the ECC circuit 13 receives user data to be written to the nonvolatile memory 20 based on the write command under the control by the control circuit 11. The ECC circuit 13 generates an ECC parity at an encoding rate controlled by the control circuit 11 based on the user data. The ECC circuit 13 adds the ECC parity to the user data and generates write data (that is, a code word). The code word is written to the nonvolatile memory 20.

In the read process, the ECC circuit 13 receives read data (that is, a code word) read from the nonvolatile memory 20 based on the read command under the control of the control circuit 11. The ECC circuit 13 extracts the ECC parity from the read data. The ECC circuit 13 generates a syndrome based on the code word. The ECC circuit 13 determines whether there is an error bit in the read data based on the syndrome. When an error bit is included in the read data, the ECC circuit 13 identifies the position of the error bit. The number of correctable error bits in the ECC circuit 13 is determined by the error correction ability of code word (for example, the number of bits of the ECC parity).

When error bits equal to or fewer than the correctable number are included in the read data, the ECC circuit 13 corrects the error bits and notifies the control circuit 11 of successful correction. When the error correction is successful, the ECC circuit 13 can restore the user data.

When the error bits more than the correctable number are included in the read data, the ECC circuit 13 notifies the control circuit 11 of the correction failure (uncorrectable error). In this case, the user data may be lost.

The nonvolatile memory 20 includes a command processing nit 21, a driving unit 22, a memory cell array 23, a column module 24, and the temperature sensor 25. The command processing unit 21 includes a sequencer 211, a command register (CMD register) 212, and an address register (ADD register) 213. The driving unit 22 includes a driver circuit 221 and a row decoder (R/D) 222. The nonvolatile memory 20 may include a plurality of memory chips.

The memory cell array 23 includes a plurality of physical blocks. Each of the plurality of physical blocks includes a plurality of memory cells (a plurality of memory cell transistors MT). Each memory cell is associated with a row and a column. The memory cell array 23 includes a storage area and a management information storing area. The user data transmitted from the memory controller 10 is stored in the storage area. The management information transmitted from the memory controller 10 is stored in the management information storing area.

The row decoder 222 selects a block to be accessed and further selects a row in the selected block.

The driver circuit 221 supplies a voltage to the selected block via the row decoder 222.

The column module 24 includes, for example, a sense amplifier and a data latch including a plurality of latch circuits. During the write operation, the column module 24 transmits data DAT received from the memory controller 10 to the memory cell array 23. Also, during the read operation, the column module 24 senses data read from the memory cell array 23 and executes necessary calculations. Also, the column module 24 outputs the obtained data DAT to the memory controller 10.

The address register 213 stores an address ADD received from the memory controller 10. The command register 212 stores a command CMD received from the memory controller 10.

The sequencer 211 controls operations of the entire nonvolatile memory 20 based on the command CMD stored in the command register 212.

The temperature sensor 25 measures temperature near the memory cell array 23 constantly, periodically, or as needed.

The measured temperature may be used for temperature compensation of an operation in the nonvolatile memory 20. The measured temperature may be output to the memory controller 10 as the signal TEMP.

Figure 2:
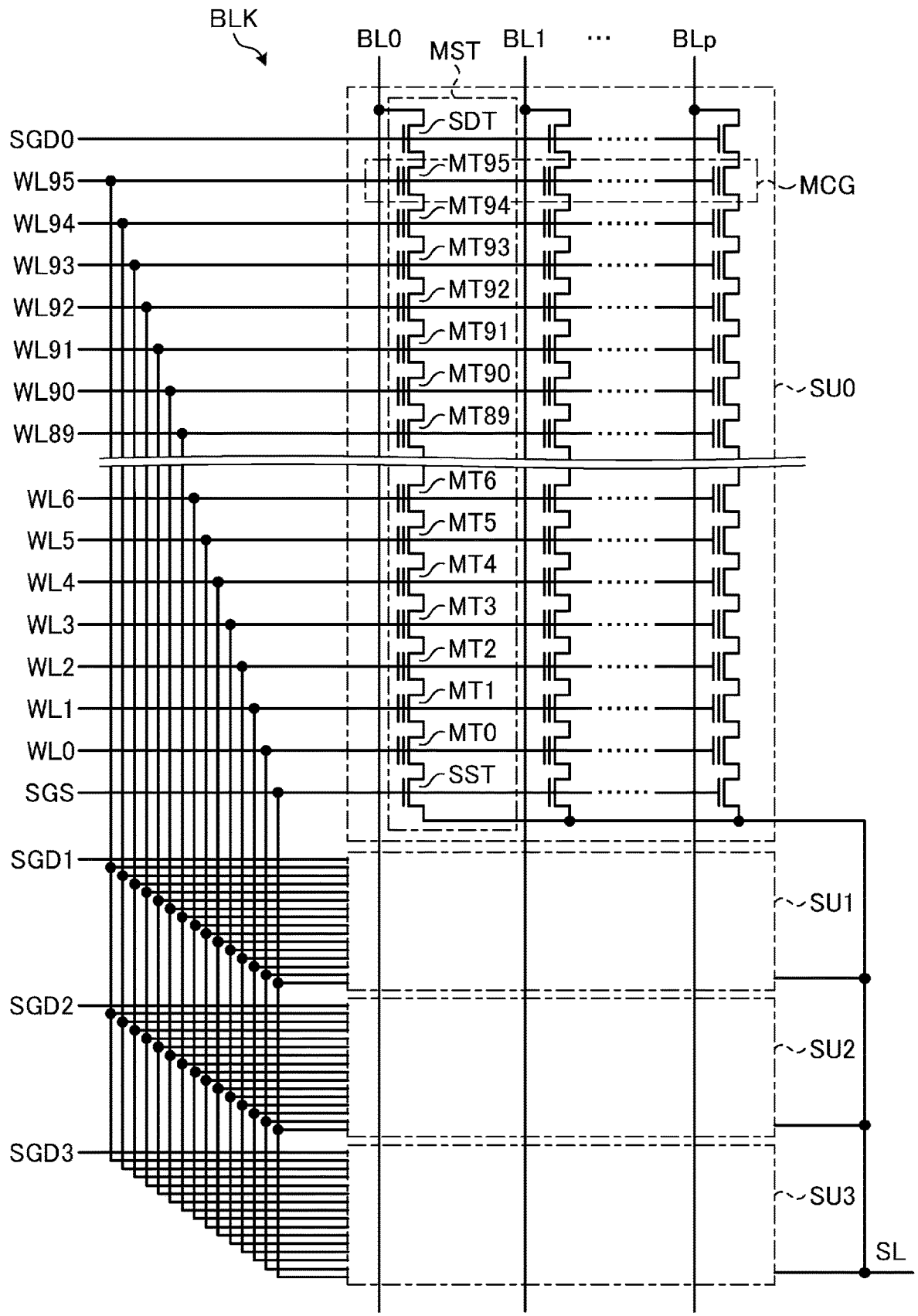
FIG. 2 is a circuit diagram illustrating a configuration of a memory cell array according to the first embodiment.

FIG. 2 is a circuit diagram illustrating a configuration of the memory cell array.

Each physical block BLK includes a plurality of string units SU0 to SU3. The plurality of string units SU0 to SU3 correspond to a plurality of select gate lines SGD0 to SGD3, respectively. The plurality of string units SU0 to SU3 share a select gate line SGS. Each of the string units SU0 to SU3 functions as a drive unit in the physical block BLK. That is, each of the string units SU0 to SU3 can be driven by the corresponding select gate lines SGD0 to SGD3 and the select gate line SGS. Each of the string units SU0 to SU3 includes a plurality of memory strings MST.

Each of the memory strings MST includes, for example, 96 memory cell transistors MT (MT0 to MT95) and select transistors SDT and SST. The memory cell transistor MT includes the control gate and a charge storage film and stores data in a nonvolatile manner. The 96 memory cell transistors MT (MT0 to MT95) are connected to each other in series via a bit line BL, between the source of the select transistor SDT and the drain of the select transistor SST. The number of the memory cell transistors MT in the memory string MST is not limited to 96.

Word lines WL0 to WL95 (denoted by WL when each word line is not distinguished) commonly connect the control gates of the memory cell transistors MT of the memory strings MST in the physical block BLK. That is, in each string unit SU in the physical block BLK, gates of the memory cell transistors MT in the same row are connected to the same word line WL. Each string unit SU of the physical block BLK includes a plurality of memory cell groups MCG respectively corresponding to the plurality of word lines WL. Each of the memory cell groups MCG includes (p+1) memory cell transistors MT connected to the same word line WL. When each memory cell transistor MT is configured to store a 1-bit value (that is, when each memory cell transistor MT operates in a single-level cell (SLC) mode), the memory cell group MCG stores data of one page. In this case, the write operation and the read operation are executed per data of one page.

Each memory cell transistor MT may be configured so as to store a value of a plurality of bits. For example, in a case where each memory cell transistor MT can store a value of n (n≥2) bits, the storage capacity per memory cell group MCG becomes identical to the size of n pages. That is, each memory cell group MCG stores data of n pages. In a multi-level cell (MLC) mode in which each memory cell transistor MT stores a 2-bit value, data of two pages is stored in each memory cell group MCG. In a triple-level cell (TLC) mode in which each memory cell transistor MT stores a 3-bit value, data of three pages is stored in each memory cell group MCG. In a quad-level cell (QLC) mode in which each memory cell transistor MT stores a 4-bit value, data of four pages is stored in each memory cell group MCG. In the penta-level cell (PLC) mode in which each memory cell transistor MT stores a 5-bit value, data of five pages is stored in each memory cell group MCG.

The memory cell array 23 includes a plurality of units that can be accessed in parallel by the memory controller 10. The memory controller 10 manages the plurality of memory cell groups MCG in which the write operation and the read operation can be executed in parallel almost all at once as one superpage and manages a plurality of physical blocks in which the erase operation can be executed in parallel as one superblock.

Also, the control circuit 11 manages data in the nonvolatile memory 20 by using a cluster that is a data management unit of a unit smaller than one page. For example, the cluster size is equal to or larger than a size of a sector that is the minimum access unit from the host 30 and is determined so that multiplication of a natural number of the cluster size becomes the page size. For example, one page is four clusters. For example, one superpage stores data of 64 clusters.

FIGS. 3A to 3E are diagrams illustrating the threshold voltage distribution of the memory cell. As illustrated in FIGS. 3A to 3E, as the number of bits of data stored in the memory cell increases, a margin with respect to the reliability of data during the read process decreases.

Figure 3A:
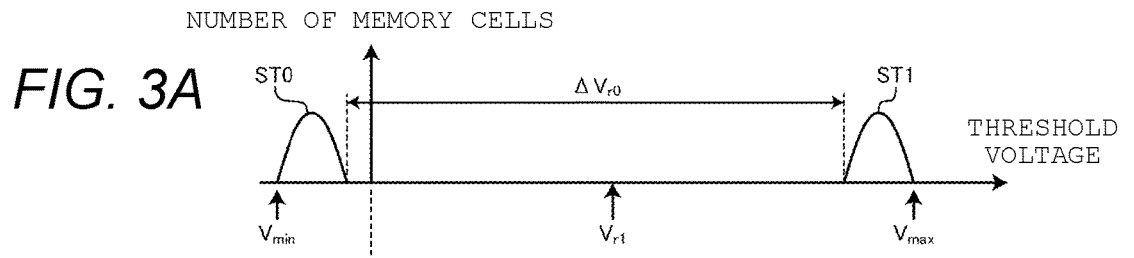
FIGS. 3A to 3E are diagrams illustrating threshold voltage distribution of a memory cell according to the first embodiment.

For example, when the memory cell is used in the SLC mode, as illustrated in FIG. 3A, in a range in which the threshold voltage is controlled (range of Vmin to Vmax), two states ST0 to ST1 exist. Each state ST indicates distribution of the threshold voltages of the memory cell. Different 1-bit values are associated in each state ST. In the embodiment, "1" and "0" are respectively associated in the states ST0 and ST1. A voltage margin ΔVr0 between the states ST0 and ST1 is relatively large, and a voltage margin between a read voltage Vr1 and the states ST on both sides can be allocated to be large. Therefore, it is considered that a bit error rate (BER) when the data of the memory cell is read at the read voltage Vr1 is relatively low.

Figure 3B:
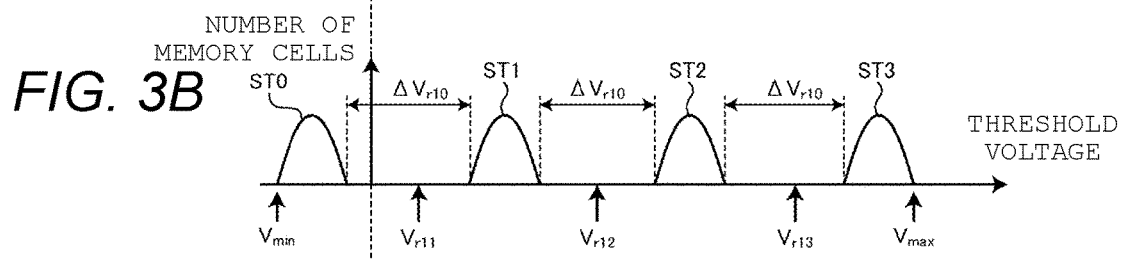

When the memory cell is used in the MLC mode, as illustrated in FIG. 3B, in the range in which the threshold voltage is controlled (range of Vmin to Vmax), four states ST0 to ST3 exist. Different 2-bit values are associated in each state ST. In the embodiment, "11" to "00" are associated with the states ST0 to ST3, respectively. A voltage margin ΔVr10 between two adjacent states among the states ST0 to ST3 is smaller than the voltage margin ΔVr0 of the case of SLC, and the voltage margin between each of the read voltages Vr11 to Vr13 and the states ST on both sides is smaller than that of the case of SLC. Therefore, it is considered that the bit error rate (BER) when data of the memory cell is read at each of the read voltages Vr11 to Vr13 is increased compared with that of the case of SLC.

Figure 3C:
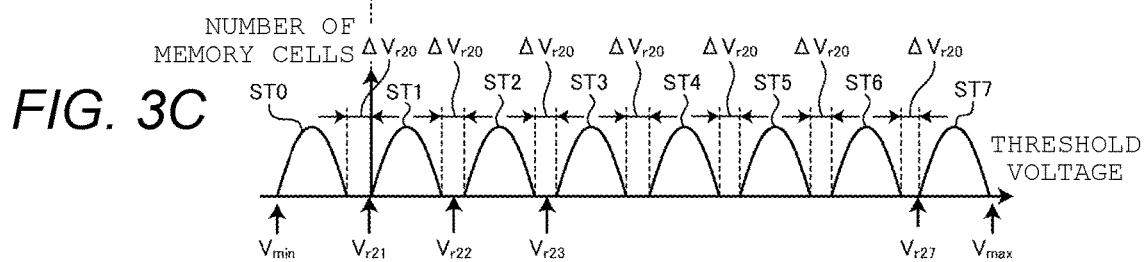

When the memory cell is used in the TLC mode, as illustrated in FIG. 3C, in the range in which the threshold voltage is controlled (range of Vmin to Vmax), eight states ST0 to ST7 exist. Different 3-bit values are associated in each state ST. In the embodiment, "111" to "000" are associated with the states ST0 to ST7, respectively. A voltage margin ΔVr20 between two adjacent states among the states ST0 to ST7 is smaller than the voltage margin ΔVr10 of the case of MLC, and the voltage margin between the read voltages Vr21 to Vr27 and the states ST on both sides is smaller than that of the case of MLC. Therefore, it is considered that the bit error rate (BER) when the data of the memory cell is read at each of the read voltages Vr21 to Vr27 is increased compared with that of the case of MLC.

Figure 3D:
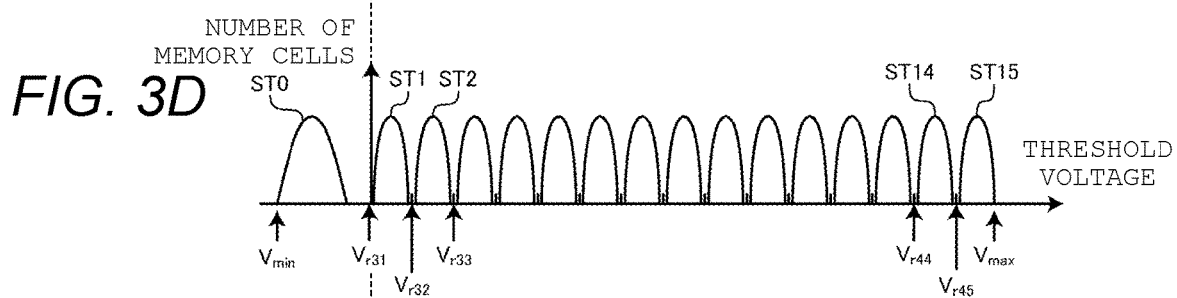

When the memory cell is used in the QLC mode, as illustrated in FIG. 3D, in the range in which the threshold voltage is controlled (range of Vmin to Vmax), 16 states ST0 to ST15 exist. Different 4-bit values are associated in each state ST. In the embodiment, "1111" to "0000" are associated with the states ST0 to ST15, respectively. A voltage margin between two adjacent states among the states ST0 to ST15 is smaller than the voltage margin ΔVr20 of the case of TLC, and the voltage margin between the read voltages Vr31 to Vr45 and the states ST on both sides is smaller than that of the case of TLC. Therefore, it is considered that the bit error rate (BER) when the data of the memory cell is read at each of the read voltages Vr31 to Vr45 is increased compared with that of the case of TLC.

Figure 3E:
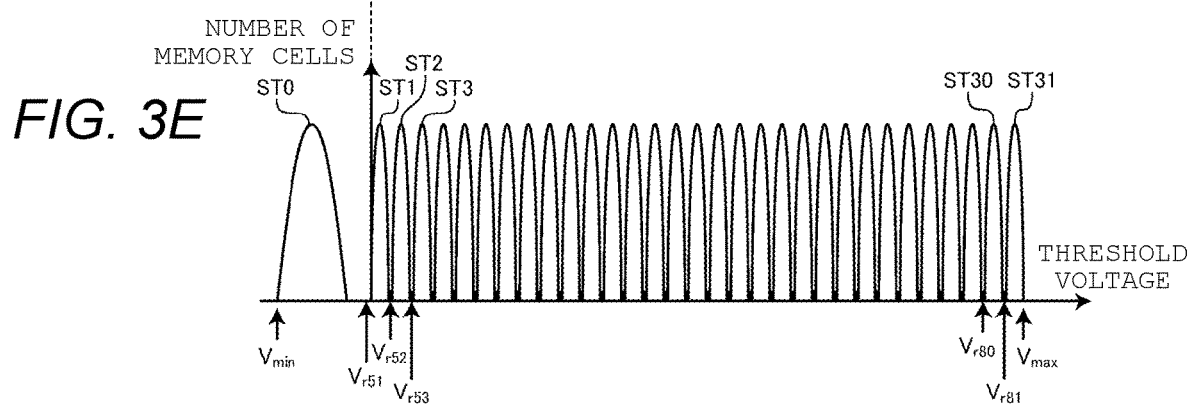

When the memory cell is used in the PLC mode, as illustrated in FIG. 3E, in the range in which the threshold voltage is controlled (range of Vmin to Vmax), 32 states ST0 to ST31 exist. Different 5-bit values are associated in each state ST. In the embodiment, "11111" to "00000" are associated with the states ST0 to ST31, respectively. A voltage margin between two adjacent states among the states ST0 to ST31 is smaller than the voltage margin of the case of QLC, and a voltage margin between read voltages Vr51 to Vr81 and the states ST on both sides is smaller than that of the case of QLC. Therefore, it is considered that the bit error rate (BER) when the data of the memory cell is read at each of the read voltages Vr51 to Vr81 is increased compared with that of the case of QLC.

In the nonvolatile memory 20, when data cannot be restored in the read process in its initial stage, a retry read process is executed. In the read process in the initial stage, the read operation is executed by a first read method. In the retry read process, the read operation is executed by a second read method.

The first read method may correspond to, for example, a normal read method or a fast read method. In the normal read method, the read voltage of a predetermined reference value (referred to as a read level) is applied to the word line WL, and a normal read operation is executed. In the fast read method, a read operation of which read time is reduced is executed by reducing application time of the read level compared with that in the normal read method.

The second read method corresponds to a read method that takes a longer average required time than the first read method and has a lower bit error rate (BER). The second read method may correspond, for example, to a shift read method or a Vth tracking method. In the shift read method, the read level is set to a value shifted from a predetermined reference value, and a read operation is executed with a value of the read level. In the Vth tracking method, single-level reading is executed a plurality of times while the read level is shifted by a predetermined voltage width so that a histogram of the threshold voltage distribution of the plurality of memory cells in the memory cell groups MCG is generated. Also, a read operation is executed with the value of the read level adjusted based on the generated histogram.

Meanwhile, in the memory cell array 23, a plurality of areas having different reliability of the memory cells are mixed. At this time, if the retry read process using a single read method is uniformly executed to all the plurality of areas, the efficiency of the retry read process may decrease.

For example, if a retry read process in a read method in which average required time is relatively short and the resilience of the data is low is executed on the area in which the reliability of the memory cell is relatively low, restoration of read data is likely to fail, and the number of times of retry is likely to increase.

If a retry read process in a read method in which average required time is relatively long and the resilience of data is high is executed on an area where reliability of the memory cell is relatively high, the retry read process may take an excessive amount of time.

If the efficiency of the retry read process decreases, the latency of the retry read process increases, and it is likely that the total performance of the read process for the nonvolatile memory 20 may deteriorate.

Therefore, in the memory system 1 according to the present embodiment, a plurality of read retry processes having different average required time are prepared. The memory system 1 selects and executes one of the plurality of read retry processes based on the state of the area to be read. As a result, the efficiency of the retry read process is improved.

An infield process and an outfield process are prepared as a plurality of read retry processes. The average required time of the infield process is shorter than the average required time of the outfield process.

The infield process is a read retry process based on the shift read method. The outfield process is a read retry process based on the Vth tracking method. In the infield process and the outfield process, a history value read operation is used in order to increase the efficiency of the read retry process itself.

A parameter when data is successfully restored by a read retry process executed in the past is stored as a history value. In the history value read operation, by executing a read operation by using the history value, it is expected that the likeliness of successful data restoration by the read retry process can be improved.

In the infield process, the read condition when the restoration of data is successful by the shift read operation executed in the past (for example, a shift index indicating a shift amount from a predetermined reference value and/or a value of a read level) is stored as the history value.

In the outfield process, the read condition when the restoration of the data is successful which is acquired by the Vth tracking executed in the past (for example, a value of the read level specified by the Vth tracking) is stored as the history value.

Here, considering a virtual space with respect to the reliability of the memory cell, an area corresponding to assumed reliability and stress state is referred to as a field. It is defined that the reliability of the memory cell in the field is higher than the reliability of the memory cell out of the field. A state in which a certain memory cell is in the field is referred that a state of the memory cell is an infield. A state in which a certain memory cell is out of the field is referred that a state of the memory cell is an outfield.

For a memory cell of which state is an infield, if the shift read operation in the infield process is executed by using the history value, it is highly likely that the restoration of data is successful. In this case, even if the Vth tracking using the history value in the outfield process (for example, a plurality of times of single-level reading executed while the read level is shifted by the predetermined voltage width from the history value) is not executed, it is considered that the likeliness that the restoration of data is successful is high. The outfield process tends to take a longer period of time than the infield process. As a result, when the state of a memory cell is an infield, the infield process is efficient as the retry read process, and the outfield process is inefficient.

For a memory cell of which state is an outfield, even if the shift read operation using the history value in the infield process is executed, it is highly likely that the restoration of data fails. In this case, the shift read operation is retried by changing the used read level from the history value, and thus it is likely that the number of times of retry increases. In this case, if the restoration of data is successful by executing the Vth tracking in the outfield process by using the history value, even if the period of time required for one time of the retry read process is longer than that for the infield process, the number of times of the retry can be reduced. Therefore, the total required period of time can be reduced compared to the infield process. That is, when the state of the memory cell is an outfield, the outfield process is efficient as the retry read process, and the infield process is inefficient.

In a plurality of areas in the memory cell array 23 in which the reliability of the memory cells is similar to each other (for example, the bit error rates are similar), it is likely that which of the infield process and the outfield process is efficient is similar. As described above, the history values used in the infield process and the outfield process are different. Considering this, in the memory system 1 according to the present embodiment, a group of memory cells of which the reliability is similar is managed as a history value sharing unit where the history value is to be shared. The history value sharing unit is a unit defined independently from a physical management unit such as a memory cell group and a block, and is a management unit abstracted as a group of memory cells with similar reliability. The history value sharing unit may be determined experimentally by testing or the like in advance.

Figure 4:
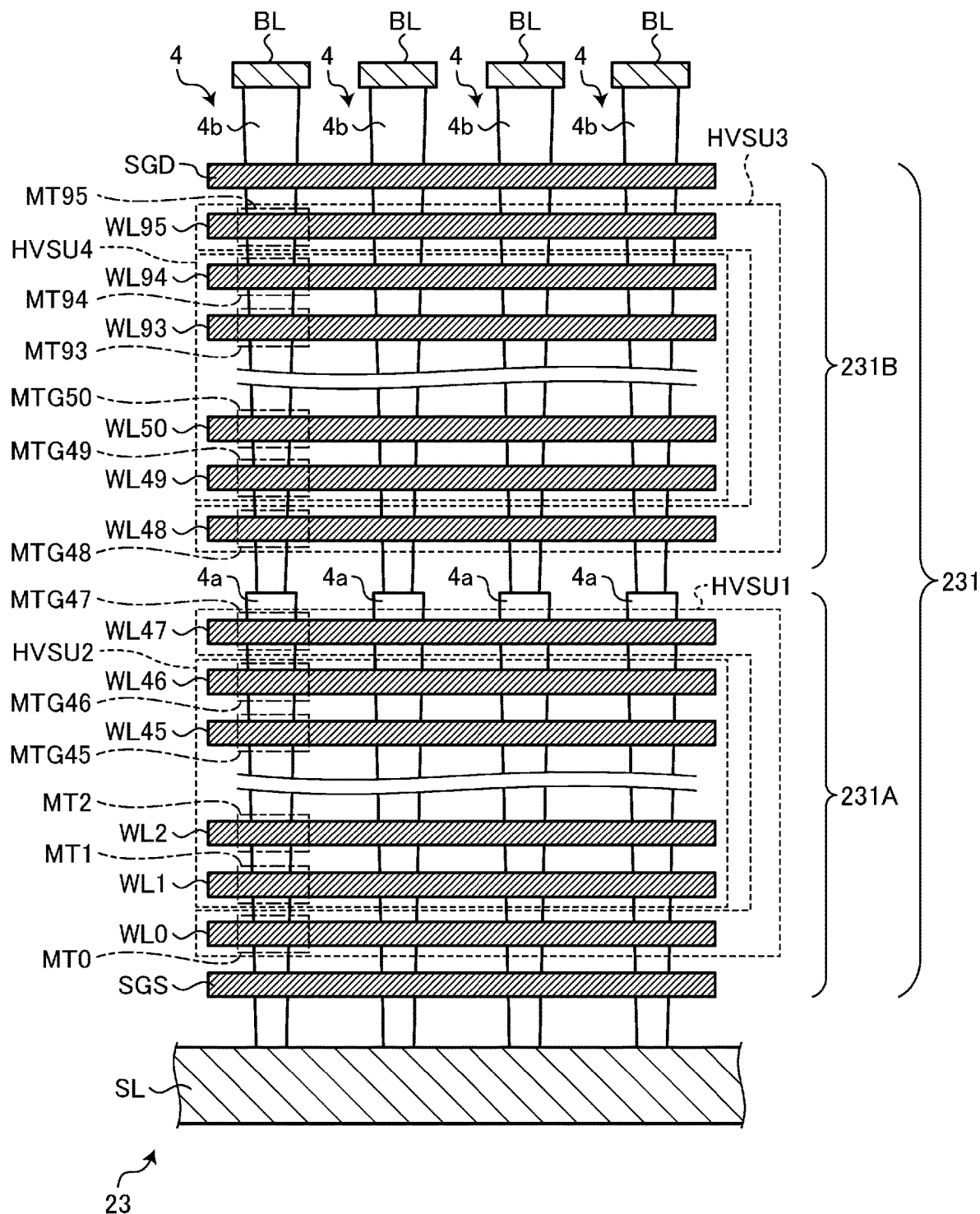
FIG. 4 is a cross-sectional view illustrating a history value sharing unit according to the first embodiment.

For example, the memory cell array 23 illustrated in FIG. 4 has a structure in which a stacked body 231 is stacked above the source line SL. In the stacked body 231, the select gate line SGS, the plurality of word lines WL0 to WL95, and the select gate line SGD are stacked while being spaced from each other. The plurality of word lines WL0 to WL95 in the stacked body 231 are penetrated by a plurality of columnar shaped bodies 4 each extending in the stacking direction. The columnar shaped body 4 has a structure in which a plurality of tiers 4a and 4b are stacked. According to this, the stacked body 231 has a structure in which a plurality of stacked bodies 231A and 231B are stacked. In FIG. 4, a structure in which the columnar shaped body 4 is divided into two tiers 4a and 4b, and the stacked body 231 is divided into two stacked bodies 231A and 231B is illustrated. However, the columnar shaped body 4 may be divided into three or more, and the stacked body 231 may be divided into three or more.

In the stacked body 231A, the select gate line SGS and the plurality of word lines WL0 to WL47 are stacked while being spaced from each other. By inspection or the like, among the plurality of word lines WL0 to WL47, if it is revealed that the reliability of memory cells MT0 and MT47 corresponding to the word lines WL0 and WL47 on both ends in the stacking direction is similar to each other, areas corresponding to the word lines WL0 and WL47 may be determined as a history value sharing unit HVSU1. By inspection or the like, among the plurality of word lines WL0 to WL47, if it is revealed that the reliability of the memory cells MT1 to MT46 corresponding to the word lines WL1 to WL46 on the inner side in the stacking direction is similar to each other, an area corresponding to the word lines WL1 to WL46 may be determined as a history value sharing unit HVSU2.

In the stacked body 231B, the plurality of word lines WL48 to WL95, and the select gate line SGD are stacked while being spaced from each other. By inspection or the like, among the plurality of word lines WL48 to WL95, if it is revealed that reliability of the memory cells MT48 and MT95 corresponding to the word lines WL48 and WL95 on both ends in the stacking direction is similar to each other, an area corresponding to the word lines WL48 and WL95 may be determined as a history value sharing unit HVSU3. By inspection or the like, among the plurality of word lines WL48 to WL95, if it is revealed that the reliability of the memory cells MT49 to MT94 corresponding to the word lines WL49 to WL94 on the inner side in the stacking direction, an area corresponding to the word lines WL49 to WL94 may be determined as a history value sharing unit HVSU4.

In FIG. 4, the history value sharing unit is exemplified as a unit smaller than the physical block, but as long as the reliability of the memory cells is similar to each other, the history value sharing unit may be determined regardless of the physical management unit. For example, if the reliability of the memory cell is similar to each other, the history value sharing unit may be determined throughout the plurality of physical blocks.

With respect to the history value sharing unit determined experimentally by inspection or the like in advance, the state thereof may be managed with history value sharing management information, for example, as illustrated in FIG. 5. FIG. 5 is a diagram illustrating the history value sharing management information. In FIG. 5, a case where the history value sharing management information is implemented in a table format is exemplified. In a history value sharing management table, the history value sharing unit identifier and the state are associated with the plurality of history value sharing units. The history value sharing unit identifier is information for identifying the history value sharing unit from other history value sharing units. The state is information related to the reliability of the memory cell in the history value sharing unit and includes an infield or an outfield. The state may be initially an infield.

The memory controller 10 can store the history value sharing management table in the management information storing area of the memory cell array 23. According to the start-up of the memory system 1, the memory controller 10 reads the history value sharing management table from the management information storing area and stores the history value sharing management table in the RAM 14. Also, the memory controller 10 can update the history value sharing management table on the RAM 14. The memory controller 10 acquires the history value sharing management table from the RAM 14 at a predetermined timing and stores the history value sharing management table in the management information storing area of the memory cell array 23. As a result, the history value sharing management table is made nonvolatile.

The history value sharing management table illustrated in FIG. 5 indicates that the history value sharing units HVSU1, HVSU3, and HVSU5 are in the outfield state. Similarly, it is illustrated that the history value sharing units HVSU2, HVSU4, and HVSU6 are in the infield state.

Also, the history value to be used in the history value sharing unit may be managed, for example, with history value management information illustrated in FIG. 6. FIG. 6 is a diagram illustrating the history value management information. In FIG. 6, a case where the history value management information is implemented in a table format is exemplified. In a history value management table, the history value sharing unit identifier and the history value are associated for a plurality of history value sharing units. The history value corresponds to the read condition with which the restoration of the data is successful in the past and includes the shift index in the infield process or a value of a read level in the outfield process.

The memory controller 10 can store the history value management table in the management information storing area of the memory cell array 23. According to the start-up of the memory system 1 or the like, the memory controller 10 reads the history value management table from the management information storing area and stores the history value management table in the RAM 14. Also, the memory controller 10 can update the history value management table on the RAM 14. The memory controller 10 acquires the history value management table from the RAM 14 at the predetermined timing and stores the history value management table in the management information storing area. As a result, the history value management table is made nonvolatile.

The history value management table illustrated in FIG. 6 illustrates that the history value sharing units HVSU1, HVSU3, and HVSU5 are to use the history values of the outfield process (that is, values Vth1, Vth3, and Vth5 of the read level). Similarly, it is indicated that the history value sharing units HVSU2, HVSU4, and HVSU6 are to use the history values of the infield process (that is, the shift indexes Index #3, Index #4, and Index #2).

Figure 7:
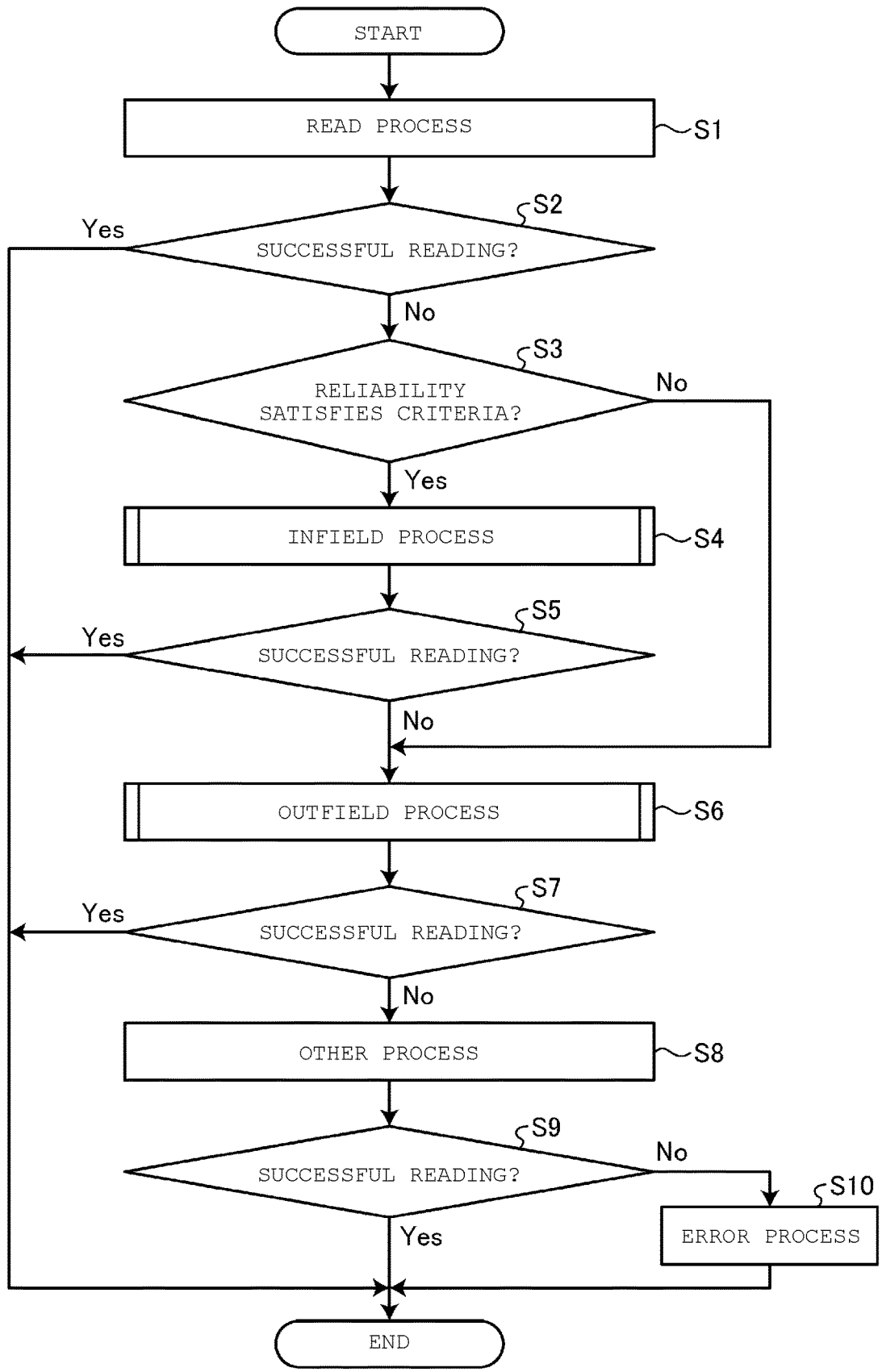
FIG. 7 is a flowchart illustrating an operation of the memory system according to the first embodiment.

Next, an operation of the memory system 1 is described with reference to FIG. 7. FIG. 7 is a flowchart illustrating the operation of the memory system 1.

In the memory system 1, the memory controller 10 executes a read process in its initial stage according to a predetermined request (S1). The predetermined request includes a host request and an internal process request. The predetermined request may be a read request or may be a patrol read request. The memory controller 10 may execute the read process in the initial stage upon receiving a read request from the host 30. The memory controller 10 may execute the read process in the initial stage upon internally generating the patrol read request at a timing when patrol reading is to be executed.

When receiving read data from the nonvolatile memory 20 as a result of Step S1, the memory controller 10 determines whether the reading is successful (S2). When error correction on the read data is successful, and the user data can be restored, the memory controller 10 determines that the reading is successful (Yes in S2) and ends the process.

When the error correction on the read data fails, and the user data cannot be restored, the memory controller 10 determines that the reading fails (No in S2) and determines whether reliability of the target area of the predetermined request satisfies the criteria (S3). When the predetermined request is the read request from the host 30, the target area of the predetermined request is an area designated by the read request. When the predetermined request is the patrol read request, the target area of the predetermined request is the area designated by the patrol read request. The reliability of the target area includes the degree of wear-out of the memory cell of the target area or the reliability of the data stored in the memory cell of the target area.

In the determination of Step S3, various criteria are used. The various criteria are determined based on various indicators on an area in the memory cell array 23, which may be larger than and include the target area of the predetermined request, or may be smaller than and be included in the target area of the predetermined request.

For example, the memory controller 10 may manage the number of write-and-erase cycles on the memory cell array 23 per unit area of the erase operation. The unit area of the erase operation may be a physical block or may be a superblock. The memory controller 10 may manage the number of write-and-erase cycles by using management information obtained by associating the identifier of the area and the number of write-and-erase cycles for a plurality of areas. The memory controller 10 may include a counter per unit area of the erase operation and manage the number of write-and-erase cycles by using the counter.

In this case, when the number of write-and-erase cycles of a unit area of the erase operation included in the target area of the predetermined request (or a unit area of the erase operation that includes the target area of the predetermined request) is a first threshold or smaller, the memory controller 10 determines that the reliability of the target area satisfies the criteria (Yes in S3). The first threshold corresponds to the number of write-and-erase cycles at which the degree of wear-out of the memory cell of the target area is within the predetermined range. When the number of write-and-erase cycles of the target area is larger than the first threshold, the memory controller 10 determines that the reliability of the target area does not satisfy the criteria (No in S3).

Otherwise, the memory controller 10 may manage the number of times of reading on the memory cell array 23 per unit area of the read operation. The unit area of the read operation may be the memory cell group MCG or may be a superpage. The memory controller 10 may manage the number of times of reading by using the management information obtained by associating the identifier of the area and the number of times of reading for the plurality of unit areas. The memory controller 10 may include a counter per unit area and manage the number of times of reading by using the counter.

In this case, when the number of times of reading of a unit area of the read operation included in the target area of the predetermined request (or a unit area of the read operation that includes the target area of the predetermined request) is a second threshold or smaller, the memory controller 10 determines that the reliability of the target area satisfies the criteria (Yes in S3). The second threshold corresponds to the number of times of reading whereby the reliability of the data stored in the memory cell of the target area is within the predetermined range. When the number of times of reading of the target area is larger than the second threshold, the memory controller 10 determines that the reliability of the target area does not satisfy the criteria (No in S3).

Otherwise, the memory controller 10 may manage a timing when regular refresh is executed and a timing when forced refresh is executed per unit area of the refresh operation (for example, a superblock). The memory controller 10 periodically executes regular refresh every predetermined period. The memory controller 10 executes forced refresh when the bit error rate of read data exceeds a threshold. Alternatively, the memory controller 10 shortens the time interval of the regular refresh when the bit error rate of read data exceeds a threshold. In both of the regular refresh and the forced refresh, the memory controller 10 reads data from the unit area of the refresh operation and rewrites the read data in other unit areas.

In this case, with respect to a unit area of the refresh operation included in the target area of the predetermined request (or a unit area of the refresh operation that includes the target area of the predetermined request), when the previously executed refresh is the regular refresh, the memory controller 10 determines that the reliability of the target area satisfies the criteria (Yes in S3). When the previously executed refresh on the target area is the forced refresh (that is, when a bit error rate of the read data read from the corresponding target area exceeds the threshold before the predetermined period elapses), the memory controller 10 determines that the degree of wear-out of the memory cell of the target area increases, and thus the reliability of the target area does not satisfy the criteria (No in S3).

Otherwise, with respect to the unit area of the refresh operation included in the target area of the predetermined request (or the unit area of the refresh operation that includes the target area of the predetermined request), when the time interval of the regular refresh is larger than a third threshold, the memory controller 10 determines that the reliability of the target area satisfies the criteria (Yes in S3). The third threshold corresponds to the time interval of the regular refresh in which the reliability of the data stored in the memory cell of the target area is within the predetermined range. With respect to the target area, when the time interval of the regular refresh is shorter than the third threshold, the memory controller 10 determines that the degree of wear-out of the memory cell of the target area increases, and the reliability of the target area does not satisfy the criteria (No in S3).

Otherwise, the memory controller 10 may manage the error correction ability of the ECC circuit 13 per unit area of the error correction process. The unit area of the error correction process may be the memory cell group MCG or may be a superpage. When a plurality of memory chips are connected to the memory controller 10 via a plurality of channels, respectively, the unit area of the error correction process may include memory cells included in at least some of the plurality of memory chips. When the memory cell group MCG stores data of a plurality of pages, the error correction ability may be managed per page data to be read. When the bit error rate in the unit area of the error correction process exceeds the threshold, the memory controller 10 may raise the error correction ability from a first correction ability (for example, correction ability of N bits per unit area of the error correction process) to a second correction ability (for example, correction ability of M bits more than the N bits per unit area of the error correction process). For example, in a unit area where the error correction ability is raised, the code word including the ECC parity with increased redundancy is stored.

In a unit area of the error correction process included in the target area of the predetermined request (or a unit area of the error correction process including the target area of the predetermined request), when the error correction ability is raised, the reliability of data stored in the memory cell of the target area can be somehow ensured, the memory controller 10 determines that the reliability of the target area satisfies the criteria (Yes in S3). When the error correction ability is not raised in the target area, the memory controller 10 determines that the reliability of the target area does not satisfy the criteria (No in S3).

Otherwise, the memory controller 10 may manage the temperature during writing to the memory cell array 23 per unit area of the write operation. The unit area of the write operation may be the memory cell group MCG or may be a superpage. The memory controller 10 may manage the temperature during writing by using management information in which the identifier of the area and the temperature during writing are associated for the plurality of unit areas.

In this case, when temperature during writing to a unit area of the write operation included in the target area of the predetermined request (or a unit area of the write operation that includes the target area of the predetermined request) is a fourth threshold or higher, the reliability of the data stored in the memory cell of the target area can be somehow ensured, therefore the memory controller 10 determines that the reliability of the target area satisfies the criteria (Yes in S3). The fourth threshold corresponds to a lower limit value of a temperature range in which the memory cell can properly operate (for example, 15° C.). When the temperature during writing of the target area is lower than the fourth threshold, the memory controller 10 determines that the reliability of the target area does not satisfy the criteria (No in S3).

Otherwise, when a word line corresponding to the target area of the predetermined request exists at a first position in a block, the memory controller 10 determines that the reliability of the target area satisfies the criteria (Yes in S3). The first position corresponds to a position of the word line (for example, the inner position than the ends of the block) in which the reliability of the data stored in the memory cell is within the predetermined range. When the word line corresponding to the target area exists at a second position different from the first position in the block (for example, closer to the ends than the first position), the memory controller 10 determines that the reliability of the target area does not satisfy the criteria (No in S3).

Otherwise, the memory controller 10 may manage the elapsed time from the start-up of the memory system 1. The memory controller 10 may include a timer, initiate the timer when receiving power supply, and start to measure the elapsed time. The memory controller 10 can grasp the elapsed time from the start-up of the memory system 1 by referring to the timer.

In this case, when the elapsed time from the start-up of the memory system 1 is a fifth threshold or longer, the memory controller 10 determines that the reliability of the target area of the predetermined request satisfies the criteria (Yes in S3). The fifth threshold corresponds to time from the start-up of the memory system 1 until the operation of the memory cell becomes stable. When the elapsed time from the start-up of the memory system 1 is shorter than the fifth threshold, the memory controller 10 determines that the reliability of the target area does not satisfy the criteria (No in S3).

When the reliability of the target area of the predetermined request satisfies the criteria (Yes in S3), the memory controller 10 executes the infield process (S4).

When receiving read data from the nonvolatile memory 20 as a result of Step S4, the memory controller 10 determines whether the reading is successful (S5). When the error correction on the read data is successful and the user data can be restored, the memory controller 10 determines that the reading is successful (Yes in S5) and ends the process.

When the reliability of the target area of the predetermined request does not satisfy the criteria (No in S3), the memory controller 10 executes the outfield process (S6).

Otherwise, when error correction on the read data fails as the result of Step S4, and the user data cannot be restored, the memory controller 10 determines that reading fails (No in S5) and executes the outfield process (S6).

When receiving the read data from the nonvolatile memory 20 as a result of Step S6, the memory controller 10 determines whether the reading is successful (S7). When error correction on the read data is successful and the user data can be restored, the memory controller 10 determines that the reading is successful (Yes in S7) and ends the process.

When the error correction on the read data fails As a result of Step S6, and the user data cannot be restored, the memory controller 10 determines that reading fails (No in S7), and other processes are executed for restoring the user data (S8). The other processes include a process of determining, for example, the likelihood of read data and restoring the user data (soft decision decoding process), or a process of restoring the user data by using a redundant arrays of inexpensive disks (RAID) technology.

When receiving the read data from the nonvolatile memory 20 as a result of Step S8, the memory controller 10 determines whether reading is successful (S9). When the error correction on the read data is successful and the user data can be restored, the memory controller 10 determines that reading is successful (Yes in S9) and ends the process.

When the error correction on the read data fails as a result of Step S8, and the user data cannot be restored, the memory controller 10 determines that reading fails (No in S9) and executes an error process (S10).

Figure 8:
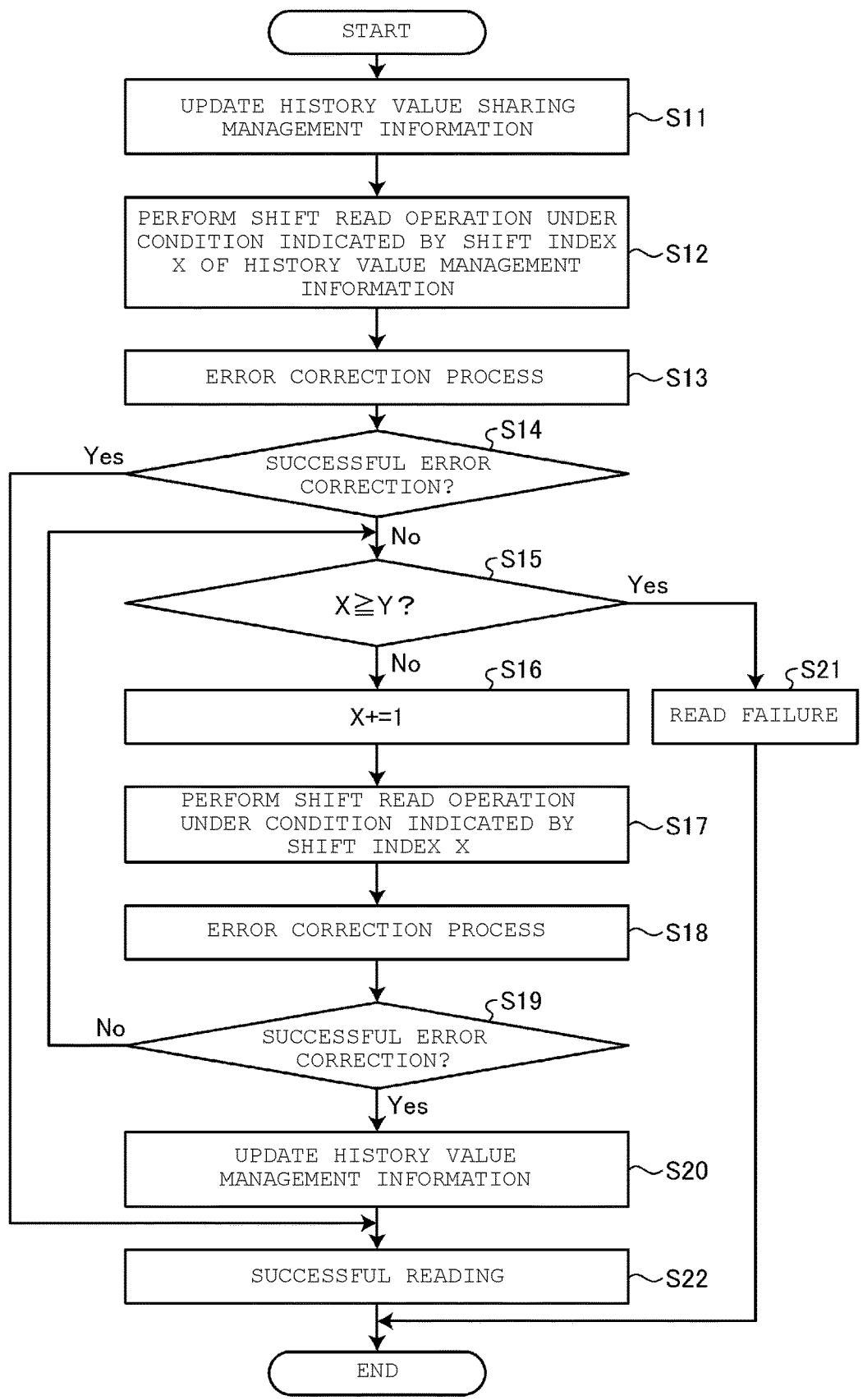
FIG. 8 is a flowchart illustrating an infield process according to the first embodiment.

Next, the infield process (S4) is described with reference to FIG. 8. FIG. 8 is a flowchart illustrating the infield process.

The memory controller 10 updates the history value sharing management information (S11) according to the start of the infield process (S4). The memory controller 10 specifies a history value sharing unit included in the target area (or a history value sharing unit including the target area) of the predetermined request (for example, a superpage). The memory controller 10 accesses the history value sharing management information on the RAM 14 (for example, the history value sharing management table illustrated in FIG.

5). The memory controller 10 maintains the state corresponding to the specified history value sharing unit without change when the state is an infield, but rewrites the state to an infield when the state is an outfield. For example, if the specified history value sharing unit is HVSU2 illustrated in FIG. 5, the memory controller 10 maintains the state since the corresponding state is an infield.

The memory controller 10 executes a shift read operation under the condition indicated by a shift index X of the history value management information (S12). X indicates a value of the shift index. In the initial state, for example, X=0. The memory controller 10 accesses the history value management information on the RAM 14 (for example, the history value management table illustrated in FIG. 6). The memory controller 10 specifies the shift index corresponding to the specified history value sharing unit. For example, if the specified history value sharing unit is HVSU2 illustrated in FIG. 6, the memory controller 10 specifies Index #3 (that is, X=3) as the shift index.

Specific contents of the specified shift index may be specified by the shift table for the infield process as illustrated in FIG. 9. FIG. 9 is a diagram illustrating a shift table for the infield process. In the shift table, the shift index and the shift read condition are associated for a plurality of shift indexes. The shift read condition includes the shift amount from the predetermined reference value and/or the value of the read level.

The memory controller 10 may store the shift table for the infield process in the management information storing area of the memory cell array 23. According to the start-up of the memory system 1, the memory controller 10 reads the shift table for the infield process from the management information storing area and stores the shift table in the RAM 14. Also, the memory controller 10 may refer to the shift table on the RAM 14.

With reference to the shift table illustrated in FIG. 9, the shift read condition corresponding to the shift index can be specified. In case of X=0 (initial value), a read level $V_0$ and/or a shift amount $\Delta V_0$ is specified. In case of X=1, a read level $V_1$ and/or a shift amount $\Delta V_1$ ($>\Delta V_0$) is specified. In case of X=2, a read level $V_2$ and/or a shift amount $\Delta V_2$ ($>\Delta V_1$) is specified. In case of X=3, a read level $V_3$ and/or a shift amount $\Delta V_3$ ($>\Delta V_2$) is specified. In case of X=4, a read level $V_4$ and/or a shift amount $\Delta V_4$ ($>\Delta V_3$) is specified. In the example of FIG. 9, as the value X of the shift index increases, a shift read condition where the shift amount from the predetermined reference value is large is obtained.

The memory controller 10 controls the nonvolatile memory 20 whereby the shift read operation is executed under the specified shift read condition on the target area of the predetermined request. For example, when the target area is included in the history value sharing unit HVSU2, the memory controller 10 controls the nonvolatile memory 20 whereby the shift read operation is executed under the shift read condition of Index #3 (see FIG. 9). In response to this, the memory controller 10 acquires the read data from the nonvolatile memory 20.

The description refers back to FIG. 8. The memory controller 10 executes the error correction process on the read data (S13).

As a result of Step S13, when the error correction is successful (Yes in S14), as the user data can be restored, and reading is successful (S22), the memory controller 10 ends the process.

As a result of Step S13, when the error correction fails (No in S14), the memory controller 10 determines whether the value X of the shift index is a predetermined threshold Y or larger (S15).

The threshold Y may be the maximum value of the shift index in the shift table. For example, when the shift table illustrated in FIG. 9 is used, the threshold Y may be set as 4. For example, when the target area of the predetermined request is included in the history value sharing unit HVSU2 and the value X of the shift index that corresponds to the history value sharing unit HVSU2 is 3, the value X of the shift index (=3) is smaller than the predetermined threshold Y (=4) (No in S15). Therefore, the memory controller 10 increments the value X of the shift index (S16) and sets X=4.

The memory controller 10 executes a shift read operation under the condition indicated by the shift index X of the history value management information (S17). For example, if X=4, the memory controller 10 controls the nonvolatile memory 20 so that the shift read operation is executed under the shift read condition of Index #4 (see FIG. 9). In response to this, the memory controller 10 acquires the read data from the nonvolatile memory 20.

The memory controller 10 executes the error correction process to the read data (S18).

As a result of Step S18, when the error correction is successful (Yes in S19), the memory controller 10 updates the history value management information (S20). The memory controller 10 accesses the history value management information on the RAM 14. For example, when the target area of the predetermined request is included in the history value sharing unit HVSU2 illustrated in FIG. 6, the memory controller 10 rewrites the history value corresponding to the history value sharing unit HVSU2, for example, from Index #3 to Index #4.

As the user data can be restored and the reading is successful (S22), the memory controller 10 ends the process.

As a result of Step S18, when the error correction fails (No in S19), the memory controller 10 returns the process to Step S15 and determines again whether the value X of the shift index is equal to or larger than the predetermined threshold Y (S15).

For example, when the threshold Y is 4, and the value X of the shift index is 4 (Yes in S15), as the user data cannot be restored and reading fails (S21), the memory controller 10 ends the process.

Figure 10:
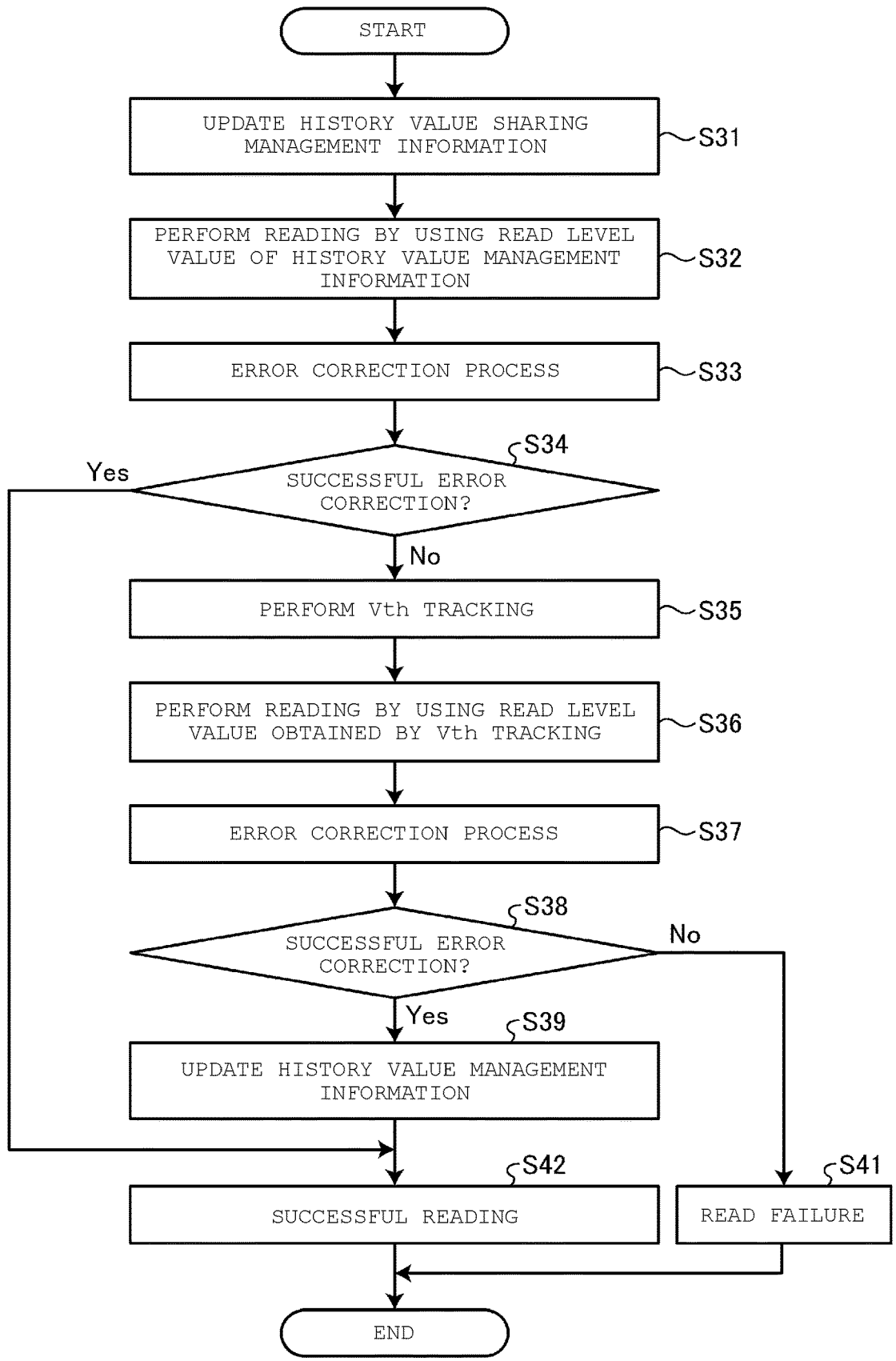
FIG. 10 is a flowchart illustrating an outfield process according to the first embodiment.

Next, the outfield process (S6) is described with reference to FIG. 10. FIG. 10 is a flowchart illustrating the outfield process.

According to the start of the outfield process (S6), the memory controller 10 updates the history value sharing management information (S31). The memory controller 10 specifies a history value sharing unit included in the target area (or a history value sharing unit including the target area) of the predetermined request (for example, a superpage). The memory controller 10 accesses the history value sharing management information (for example, the history value sharing management table illustrated in FIG. 5) on the RAM 14. The memory controller 10 maintains the state corresponding to the specified history value sharing unit when the state is an outfield, and rewrites the state into an outfield when the state is an infield. For example, if the specified history value sharing unit is HVSU1 illustrated in FIG. 5, the corresponding state is an outfield, and thus the memory controller 10 maintains the state without change.

The memory controller 10 executes reading at the value of the read level of the history value management information (S32). The memory controller 10 accesses the history value management information (for example, the history value management table illustrated in FIG. 6) on the RAM 14. The memory controller 10 specifies the value of the read level that corresponds to the specified history value sharing unit. For example, if the specified history value sharing unit is HVSU1 illustrated in FIG. 6, the memory controller 10 specifies Vth1 as the value of the read level.

The memory controller 10 controls the nonvolatile memory 20 so that reading is executed at the specified value of the read level with respect to the target area of the predetermined request. For example, when the target area is included in the history value sharing unit HVSU1, the memory controller 10 controls the nonvolatile memory 20 so as to execute reading by using the value Vth1 of the read level. In response to this, the memory controller 10 acquires the read data from the nonvolatile memory 20.

The memory controller 10 executes the error correction process on the read data (S33).

As a result of Step S33, when the error correction is successful (Yes in S34), as the user data can be restored, and reading is successful (S42), the memory controller 10 ends the process.

As the result of Step S33, when the error correction fails (No in S34), the memory controller 10 executes Vth tracking (S35). The memory controller 10 controls the nonvolatile memory 20 so that single-level reading is executed a plurality of times while the read level is shifted at the predetermined pitch width. The memory controller 10 acquires read data of each time from the nonvolatile memory 20 and counts the number of memory cells in an on state (or the number of memory cells in an off state). According to the counting result, the memory controller 10 generates the histogram of the threshold voltage distribution of the plurality of memory cells in the corresponding memory cell group MCG. The memory controller 10 calculates the value of the read level based on the generated histogram.

The memory controller 10 execute reading at the value of the read level calculated in Step S35 (S36). The memory controller 10 controls the nonvolatile memory 20 so as to execute reading by using the value (for example, Vth1a) of the read level calculated in Step S35. In response to this, the memory controller 10 acquires the read data from the nonvolatile memory 20.

The memory controller 10 executes the error correction process on the read data (S37).

As the result of Step S37, when the error correction is successful (Yes in S38), the memory controller 10 updates the history value management information (S39). The memory controller 10 accesses the history value management information on the RAM 14. For example, the memory controller 10 rewrites the history value corresponding to the history value sharing unit HVSU1 from Vth1 to Vth1a.

As the user data can be restored, and reading is successful (S42), the memory controller 10 ends the process.

As the result of Step S37, when the error correction fails (No in S38), as the user data cannot be restored and the reading fails (S41), the memory controller 10 ends the process.

As above, in the memory system 1 according to the present embodiment, a plurality of read retry processes with different average required time are prepared. The memory system 1 selects and executes one read retry process among the plurality of read retry processes based on the state of the area to be read. Accordingly, the efficiency of the retry read process can be improved.

The memory system 1 may be configured to select and execute one read retry process among a plurality of read retry processes based on individual specifications required to the memory system 1. The individual specifications include performance and/or reliability required to the memory system 1. As a result, for example, the design of the memory controller 10 and/or the firmware installed therein can be made common to a plurality of memory systems 1 having different specifications, and the design and development of the memory system 1 can be made more efficient.

Second Embodiment

Next, a memory system according to a second embodiment is described. In the following, portions different from the first embodiment are mainly described.

In the memory system according to the first embodiment, as described with reference to FIG. 7, the read process in its initial stage is executed every time according to a predetermined request. However, it may be more efficient to omit the read process in the initial stage. For example, if reading is highly likely to fail in the read process in the initial stage, it is efficient to omit the read process in the initial stage.

Figure 11:
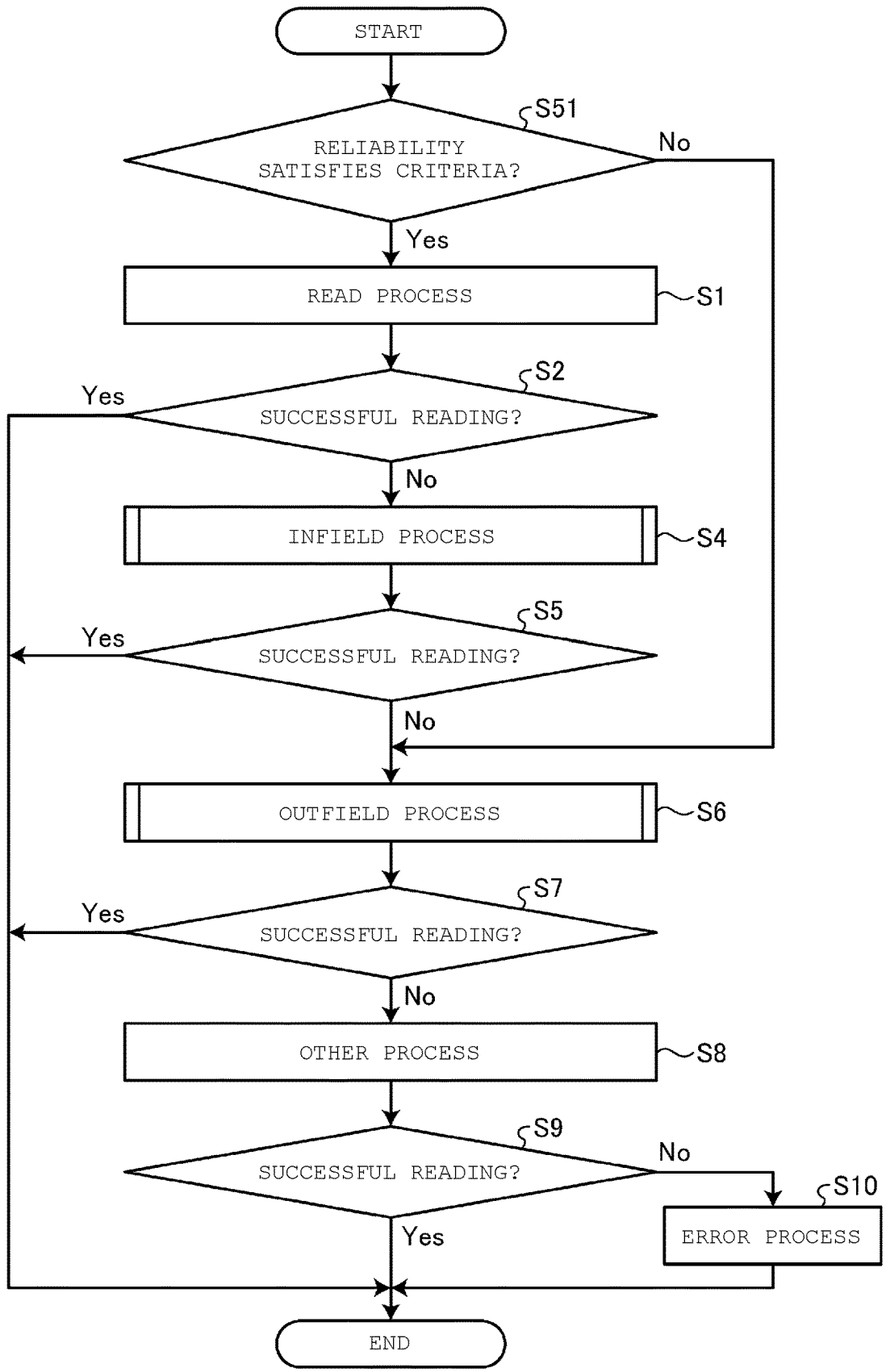
FIG. 11 is a flowchart illustrating an operation of a memory system according to a second embodiment.

Based on such consideration, the memory system 1 according to the second embodiment executes an operation different from that of the first embodiment as illustrated in FIG. 11 in the following points. FIG. 11 is a flowchart illustrating an operation of the memory system 1. In the operation illustrated in FIG. 11, the process of Step S3 described with reference to FIG. 7 is omitted, and the process of Step S51 is added before the process of Step S1.

That is, according to the predetermined request, the memory controller 10 determines whether reliability of the target area of the predetermined request satisfies the criteria (S51).

When the reliability of the target area does not satisfy the criteria (No in S51), the memory controller 10 determines that it is highly likely that reading fails in the read process in its initial stage, omits the read process in the initial stage, and executes the outfield process (S6).

When the reliability of the target area satisfies the criteria (Yes in S51), the memory controller 10 executes the read process in the initial stage according to the predetermined request (S1).

As above, in the memory system 1 according to the second embodiment, when reliability of the target area of the predetermined request does not satisfy the criteria, the read process in the initial stage is omitted, the read retry process (for example, an outfield process) is executed. As a result, the efficiency of the operation of the memory system 1 can be further improved.

Third Embodiment

Next, a memory system according to a third embodiment is described. In the following, portions different from the first embodiment and the second embodiment are mainly described.

In the memory system according to the first embodiment, as the outfield process, Vth tracking is executed. In the third embodiment, a shift read operation based on the Vth tracking is executed as the outfield process.

Figure 12:
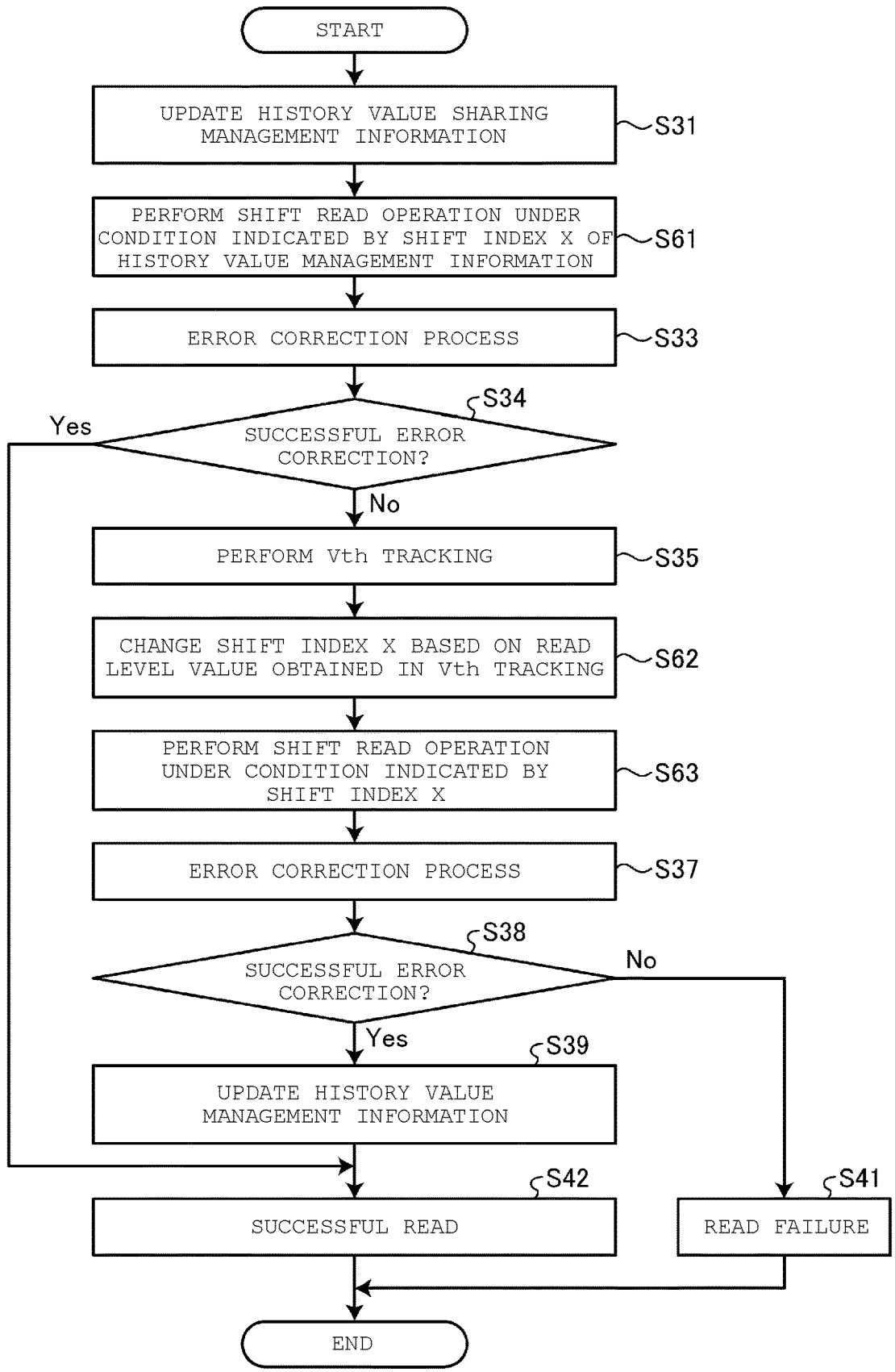
FIG. 12 is a flowchart illustrating an outfield process according to a third embodiment.

That is, as illustrated in FIG. 12, an outfield process different from the first embodiment in the following points is executed. FIG. 12 is a flowchart illustrating the outfield process (S6). In the outfield process illustrated in FIG. 12, a process of Step S61 is executed instead of the process of Step S32 described with reference to FIG. 10, and processes of Steps S62 and S63 are executed instead of the process of Step S36.

After Step S31, the memory controller 10 executes a shift read operation under the condition indicated by the shift index X of the history value management information (S61). X indicates the value of the shift index. In the initial state, for example, X=10. The memory controller 10 accesses the history value management information on the RAM 14. For example, a history value as illustrated in FIG. 13 may be recorded in the history value management information. FIG. 13 is a diagram illustrating history value management information according to the present embodiment. The history value management information according to the present embodiment is different from the history value management information according to the first embodiment described with reference to FIG. 6 in the recorded history value. That is, the history value corresponding to the outfield process is the shift index for the outfield process instead of the value of the read level.

The memory controller 10 specifies the shift index of the history value sharing unit corresponding to the target area of the predetermined request (for example, a superpage). For example, if the specified history value sharing unit is HVSU1 illustrated in FIG. 13, the memory controller 10 specifies Index #10 (that is, X=10) as the shift index.

A specific content of the specified shift index may be specified by a shift table for an outfield process illustrated in FIG. 14. FIG. 14 is a diagram illustrating the shift table for the outfield process. In the shift table, a shift index and a shift read condition are associated for a plurality of shift indexes. The shift read condition includes the shift amount from the predetermined reference value and/or the value of the read level.

The memory controller 10 may store the shift table for the outfield process in the management information storing area of the memory cell array 23. In response to the start-up of the memory system 1 and the like, the memory controller 10 may read the shift table for the outfield process from the management information storing area, store the shift table in the RAM 14, and refer to the shift table on the RAM 14.

By referring to the shift table illustrated in FIG. 14, the shift read condition corresponding to the shift index can be specified. If X is 10 (initial value), a read level $V_{10}$ and/or a shift amount $\Delta V_{10}$ is specified. If X is 11, a read level Vu and/or a shift amount $\Delta V_{11}$ ($>\Delta V_{10}$) is specified. If X is 12, a read level $V_{12}$ and/or a shift amount $\Delta V_{12}$ ($>\Delta V_{11}$) is specified. If X is 13, a read level $V_{13}$ and/or a shift amount $\Delta V_{13}$ ($>\Delta V_{12}$) is specified. In the example of FIG. 14, a shift read condition is obtained in which a shift amount from the predetermined reference value becomes larger, as the value X of the shift index becomes larger.

The memory controller 10 controls the nonvolatile memory 20 so that the shift read operation is executed on the area designated by the predetermined request under the specified shift read condition. For example, when the target area is provided in the history value sharing unit HVSU1, the memory controller 10 controls the nonvolatile memory 20 so that the shift read operation is executed under the shift read condition of Index #10 (see FIG. 14). In response to this, the memory controller 10 acquires the read data from the nonvolatile memory 20.

As the result of Step S33, when error correction fails (No in S34), the memory controller 10 executes the Vth tracking (S35). The memory controller 10 obtains the value (for example, Vth1b) of the read level by the Vth tracking.

The memory controller 10 changes the value X of the shift index based on the value of the read level calculated in Step S35 (S62). The memory controller 10 searches for a shift read condition corresponding to a read level closest to the value of the read level calculated in Step S35 with reference to the shift table for the outfield process. In case of an example illustrated in FIG. 14, if the value of the read level calculated in Step S35 is Vth1b, and the value closest to Vth1b among the read levels $V_{10}$, $V_{11}$, $V_{12}$, and $V_{13}$ is $V_{12}$, the value X of the shift index is changed to (for example, from 10) to 12.

The memory controller 10 executes a shift read operation under the condition indicated by the shift index X (S63). For example, if X is 12, the memory controller 10 controls the nonvolatile memory 20 so that the shift read operation is executed under the shift read condition of Index #12 (see FIG. 14). In response to this, the memory controller 10 acquires the read data from the nonvolatile memory 20.

Thereafter, the memory controller 10 executes processes of Step S37 and subsequent steps similarly to the first embodiment. For example, in the update of the history value management information (S39), the memory controller 10 rewrites the history value corresponding to the history value sharing unit HVSU1 from Index #10 to Index #12.

As above, in the third embodiment, the memory system 1 executes the shift read operation based on the Vth tracking as the outfield process. Also with this, an outfield process can be implemented as a retry read process with higher reliability than the infield process.

Fourth Embodiment

Next, a memory system according to a fourth embodiment is described. In the following, portions different from the first to third embodiments are mainly described.

In the memory system according to the third embodiment, the shift read operation is executed based on the Vth tracking as the outfield process. In the fourth embodiment, as the outfield process, Vth tracking or a shift read operation based on the Vth tracking is executed.

Figure 15:
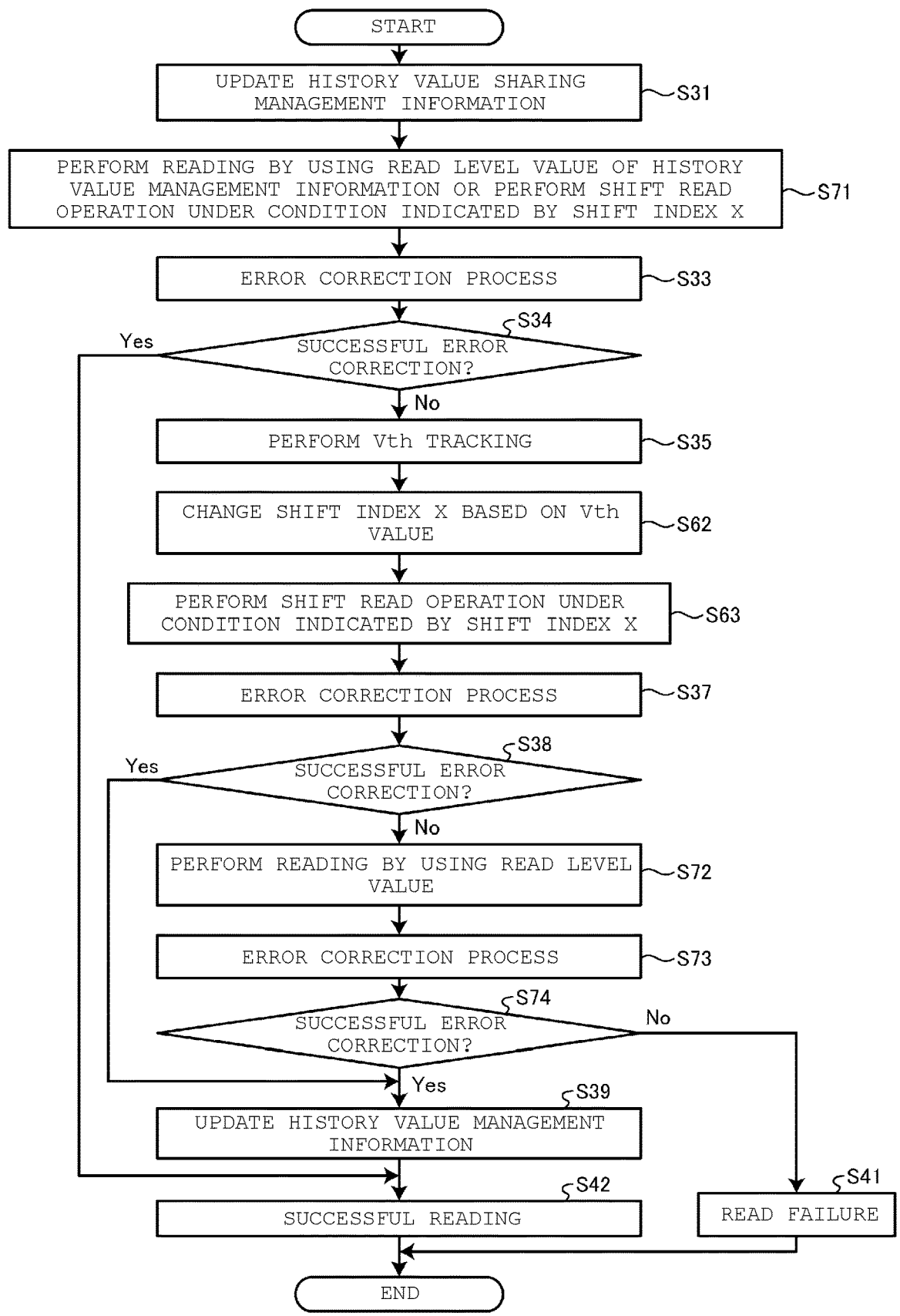
FIG. 15 is a flowchart illustrating an outfield process according to a fourth embodiment.

That is, as illustrated in FIG. 15, an outfield process different from that of the third embodiment in the following points is executed. FIG. 15 is a flowchart illustrating an outfield process (S6). In the outfield process illustrated in FIG. 15, the process of Step S71 is executed instead of the process of Step S61 described with reference to FIG. 12, Steps S72 to S74 are added between Steps S38 and S39.

After Step S31, the memory controller 10 performs reading according to the history value of the history value management information. The memory controller 10 performs reading by using the value of the read level if the history value of the history value management information is the value of the read level calculated by Vth tracking, and performs a shift read operation under the condition indicated by the shift index X if the history value of the history value management information is the shift index X (S71).

The memory controller 10 accesses the history value management information on the RAM 14. For example, the history value illustrated in FIG. 16 may be recorded in the history value management information. FIG. 16 is a diagram illustrating the history value management information according to the present embodiment. The history value management information according to the present embodiment is different from the history value management information according to the third embodiment described with reference to FIG. 13 in the recorded history values. That is, the history value corresponding to the outfield process is the value of the read level or the shift index for the outfield process.

The memory controller 10 specifies the history value of the history value sharing unit corresponding to the target area of the predetermined request (for example, a superpage). For example, if the specified history value sharing unit is HVSU1 illustrated in FIG. 16, the memory controller 10 specifies the value Vth1 of the read level as the history value. If the history value sharing unit is HVSU3 illustrated in FIG. 16, the memory controller 10 specifies the shift index Index #12 (that is, X=12) as the history value.

With respect to the target area, if the specified history value is the value of the read level calculated by Vth tracking, the memory controller 10 controls the nonvolatile memory 20 so that reading is executed with the value of the read level. With respect to the target area, if the specified history value is the shift index X, the memory controller 10 controls the nonvolatile memory 20 so that the shift read operation is executed under the shift read condition indicated by the shift index X. In response to this, the memory controller 10 acquires the read data from the nonvolatile memory 20.

Also, as a result of Step S37, when error correction is successful (Yes in S38), the memory controller 10 updates the history value management information (S39). As the user data can be restored and reading is successful (S42), the memory controller 10 ends the process.

As the result of Step S37, when the error correction fails (No in S38), the memory controller 10 controls the nonvolatile memory 20 so that reading is executed by using the value (for example, Vth1c) of the read level calculated in Step S35 (S72). In response to this, the memory controller 10 acquires the read data from the nonvolatile memory 20.

The memory controller 10 executes an error correction process on the read data (S73).

As a result of Step S73, when the error correction is successful (Yes in S74), the memory controller 10 updates the history value management information (S39). As the user data can be restored and reading is successful (S42), the memory controller 10 ends the process.

As the result of Step S73, when the error correction fails (No in S74), as the user data cannot be restored, and reading fails (S41), the memory controller 10 ends the process.

As above, according to the fourth embodiment, the memory system 1 executes Vth tracking or a shift read operation based on the Vth tracking as the outfield process. Also with this, the outfield process can be implemented as a retry read process having higher reliability than the infield process.

Fifth Embodiment

Next, a memory system according to a fifth embodiment is described. In the following, portions different from the first to fourth embodiments are mainly described.

In the memory system according to the first embodiment, the read retry process is selected based on whether reliability of the target area of the predetermined request satisfies the criteria. According to the fifth embodiment, the read retry process is selected based on the state of the history value sharing unit. The history value sharing unit used in this selection is a history value sharing unit that is larger than the target area of the predetermined request and includes the target area, or a history value sharing unit that is smaller than the target area and is included in the target area.

Figure 17:
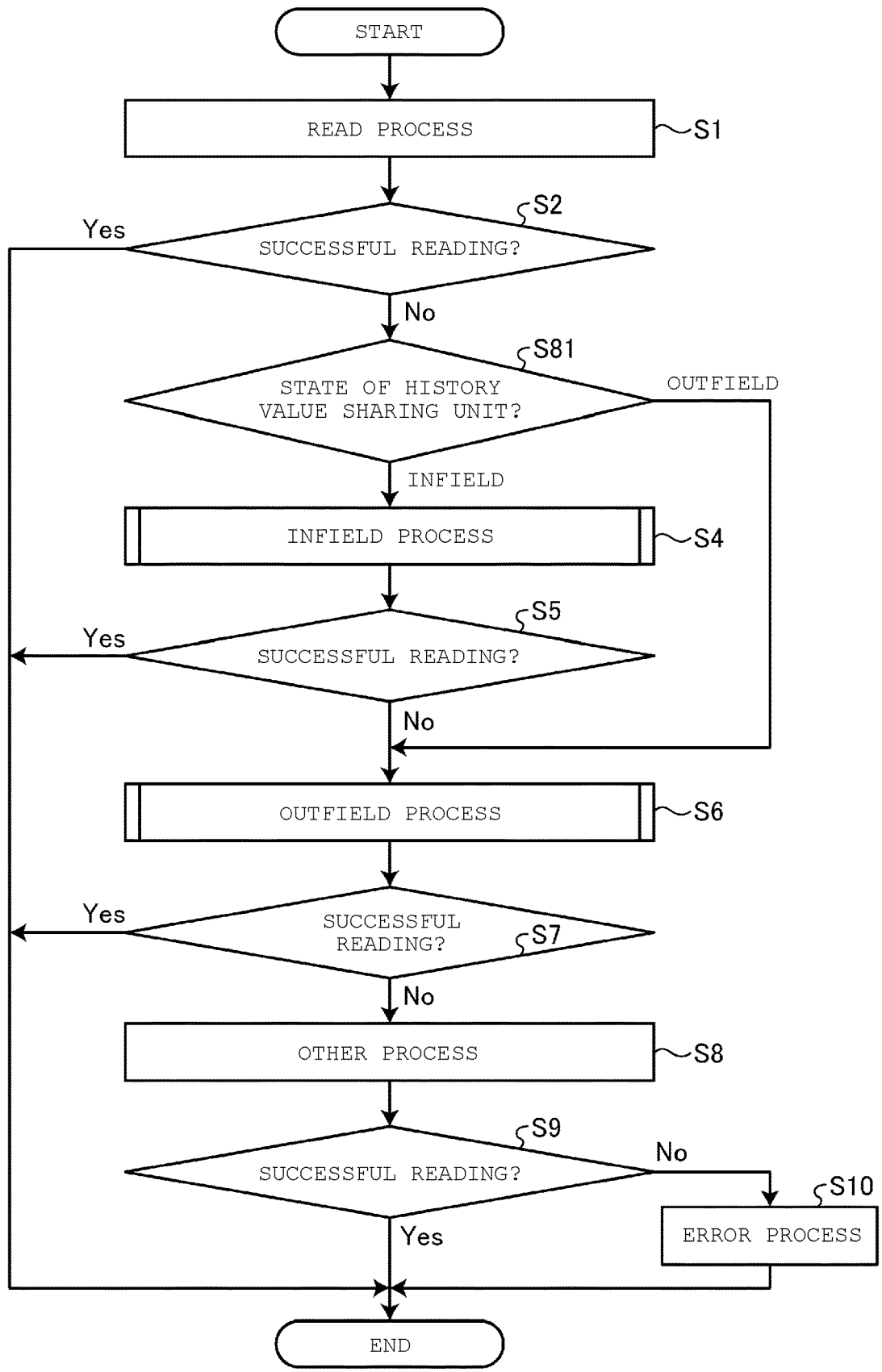
FIG. 17 is a flowchart illustrating an operation of a memory system according to a fifth embodiment.

That is, as illustrated in FIG. 17, the memory system 1 executes an operation different from the first embodiment in the following points. FIG. 17 is a flowchart illustrating an operation of the memory system 1. In the operation illustrated in FIG. 17, the process of Step S81 is executed instead of the process of Step S3 described with reference to FIG. 7.

As a result of Step S1, when error correction on the read data fails and the user data cannot be restored, the memory controller 10 determines that reading fails (No in S2) and specifies a history value sharing unit included in the target area of the predetermined request (or a history value sharing unit including the target area of the predetermined request). The memory controller 10 checks the state of the specified history value sharing unit (S81). The memory controller 10 accesses the history value sharing management information (for example, the history value sharing management table illustrated in FIG. 5) on the RAM 14.

If the state corresponding to the specified history value sharing unit is an infield ("infield" in S81), the memory controller 10 determines that the target area of the predetermined request is appropriate for the infield process and executes the infield process (S4).

If the state corresponding to the specified history value sharing unit is an outfield ("outfield" in S81), the memory controller 10 determines that the target area of the predetermined request is appropriate for the outfield process and executes the outfield process (S6).

Other points are the same as those in the first embodiment.

As above, in the memory system 1 according to the fifth embodiment, one read retry process among the plurality of read retry processes is executed based on the state of the history value sharing unit corresponding to the target area of the predetermined request. Also with this, the efficiency of the retry read process can be improved.

Sixth Embodiment

Next, a memory system according to a sixth embodiment is described. In the following, portions different from the first to fifth embodiments are mainly described.

In the memory system according to the fifth embodiment, the read process in its initial stage is executed every time according to the predetermined request as described above with reference to FIG. 17. However, similarly to the second embodiment described with reference to FIG. 11, it may be more efficient to omit the read process in the initial stage.

Figure 18:
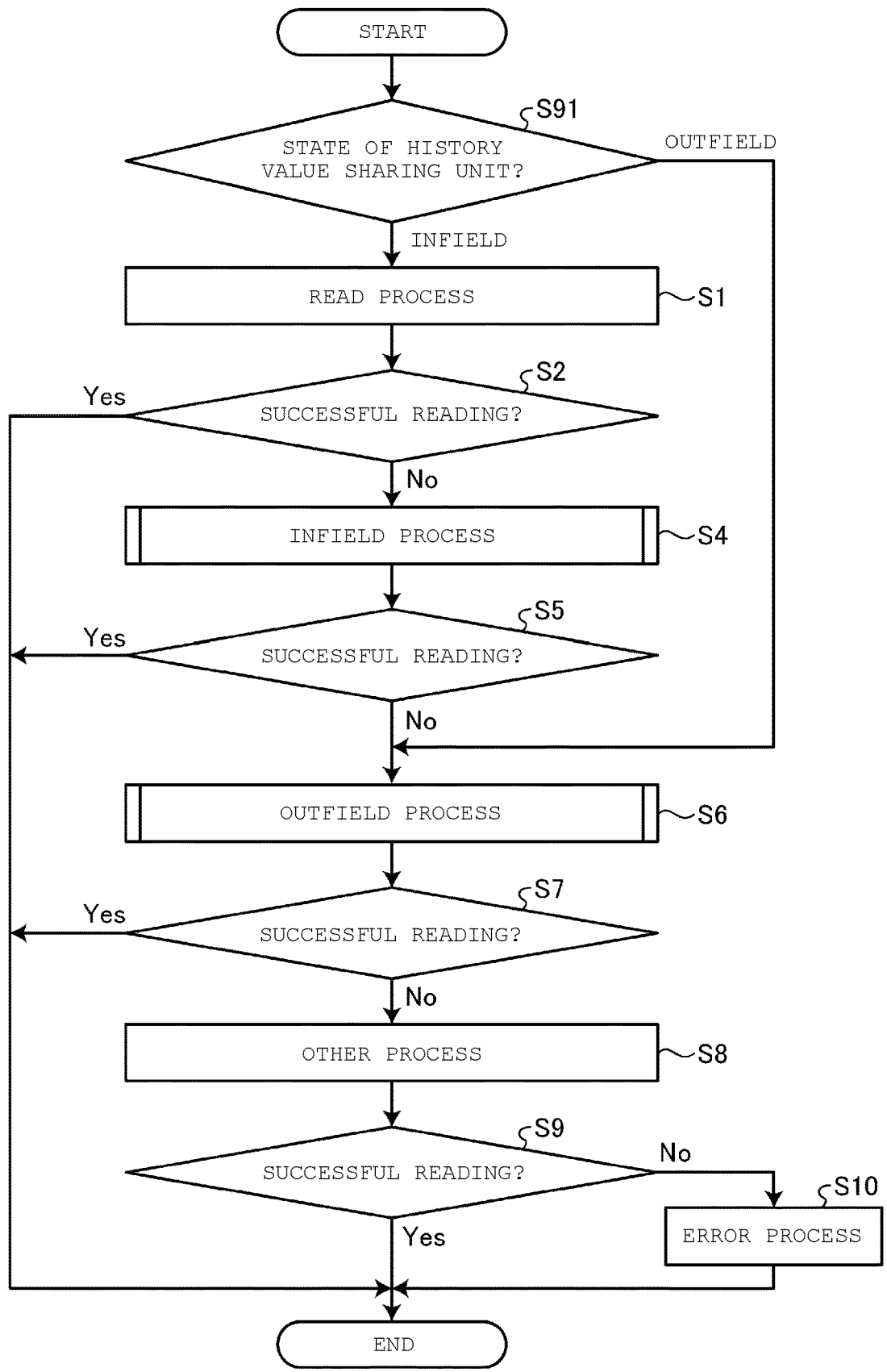
FIG. 18 is a flowchart illustrating an operation of a memory system according to a sixth embodiment.

Based on such consideration, the memory system 1 according to the sixth embodiment executes an operation different from that of the fifth embodiment in the following points as illustrated in FIG. 18. FIG. 18 is a flowchart illustrating an operation of the memory system 1. In the operation illustrated in FIG. 18, the process of Step S81 described with reference to FIG. 17 is omitted, and the process of Step S91 is added before the process of Step S1.

That is, the memory controller 10 checks the state of a history value sharing unit corresponding to the target area of the predetermined request according to the predetermined request (S91).

If the state corresponding to the specified history value sharing unit is an outfield ("outfield" in S91), the memory controller 10 determines that the target area of the predetermined request is appropriate for the outfield process and it is highly likely that reading fails in the read process in the initial stage, omits the read process in the initial stage, and executes the outfield process (S6).

If the state corresponding to the specified history value sharing unit is an infield ("infield" in S91), the memory controller 10 executes the read process in the initial stage according to the predetermined request (S1).

As above, in the memory system 1 according to the sixth embodiment, the read process in the initial stage is omitted when the state of the history value sharing unit corresponding to the target area of the predetermined request is appropriate for the outfield process and the read retry process (for example, the outfield process) is executed. With this, the efficiency of the operation of the memory system 1 can be further improved.

Seventh Embodiment

Next, a memory system according to a seventh embodiment is described. In the following, portions different from the first to sixth embodiments are mainly described.

In the memory system according to the seventh embodiment, an operation obtained by combining the first embodiment and the fifth embodiment is executed. That is, in the memory system 1, when the reliability of the target area of the predetermined request satisfies the criteria, and the state of a history value sharing unit corresponding to the target area is an infield, the memory controller 10 executes the infield process. When the reliability of the target area of the predetermined request does not satisfy the criteria, or the state of the history value sharing unit corresponding to the target area is an outfield, the memory controller 10 executes the outfield process.

Figure 19:
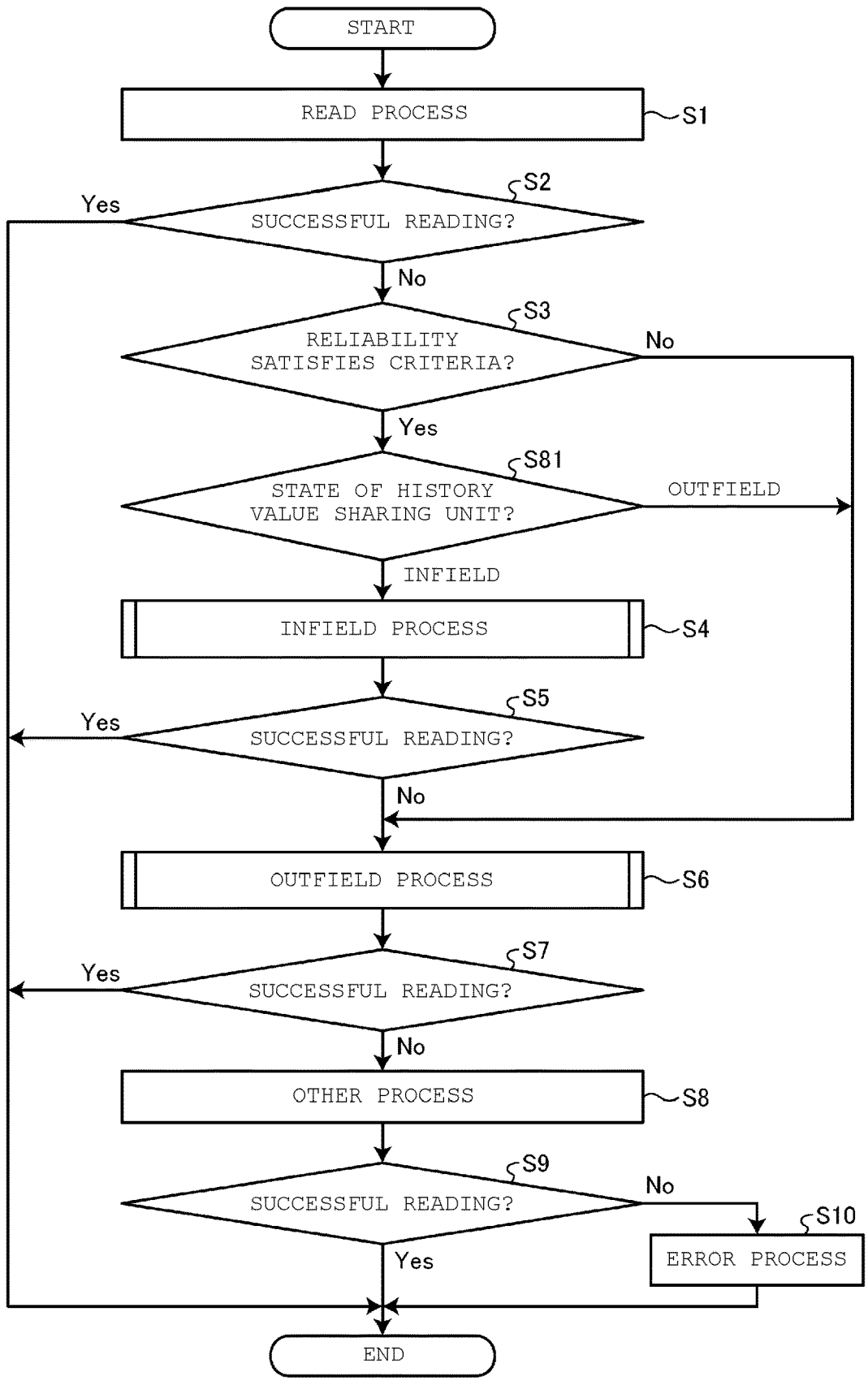
FIG. 19 is a flowchart illustrating an operation of a memory system according to a seventh embodiment.

That is, as illustrated in FIG. 19, the memory system 1 executes an operation different from the first embodiment in the following points. FIG. 19 is a flowchart illustrating an operation of the memory system 1. In the operation illustrated in FIG. 19, the process of Step S81 is added between the processes of Steps S3 and S4 described with reference to FIG. 7.

When the reliability of the target area of the predetermined request satisfies the criteria (Yes in S3), the memory controller 10 checks the state of a history value sharing unit corresponding to the target area of the predetermined request (S81).

If the state corresponding to the history value sharing unit is an infield ("infield" in S81), the memory controller 10 determines that the target area of the predetermined request is appropriate for the infield process and executes the infield process (S4).

If the state corresponding to the history value sharing unit is an outfield ("outfield" in S81), the memory controller 10 determines that the target area of the predetermined request is appropriate for the outfield process and executes the outfield process (S6).

Other points are the same as those in the first embodiment.

As above, in the memory system 1 according to the seventh embodiment, one read retry process among the plurality of read retry processes is executed based on the reliability of the target area of the predetermined request and the state of the history value sharing unit corresponding to the target area of the predetermined request. Also with this, the efficiency of the retry read process can be improved.

In the operation illustrated in FIG. 19, the order of Step S3 and Step S81 may be switched.

Eighth Embodiment

Next, a memory system according to an eighth embodiment is described. In the following, portions different from the first to seventh embodiments are mainly described.

In the memory system according to the seventh embodiment, the read process in its initial stage is executed every time according to the predetermined request as described above with reference to FIG. 19. However, similarly to the second embodiment described with reference to FIG. 11, it may be more efficient to omit the read process in the initial stage.

Figure 20:
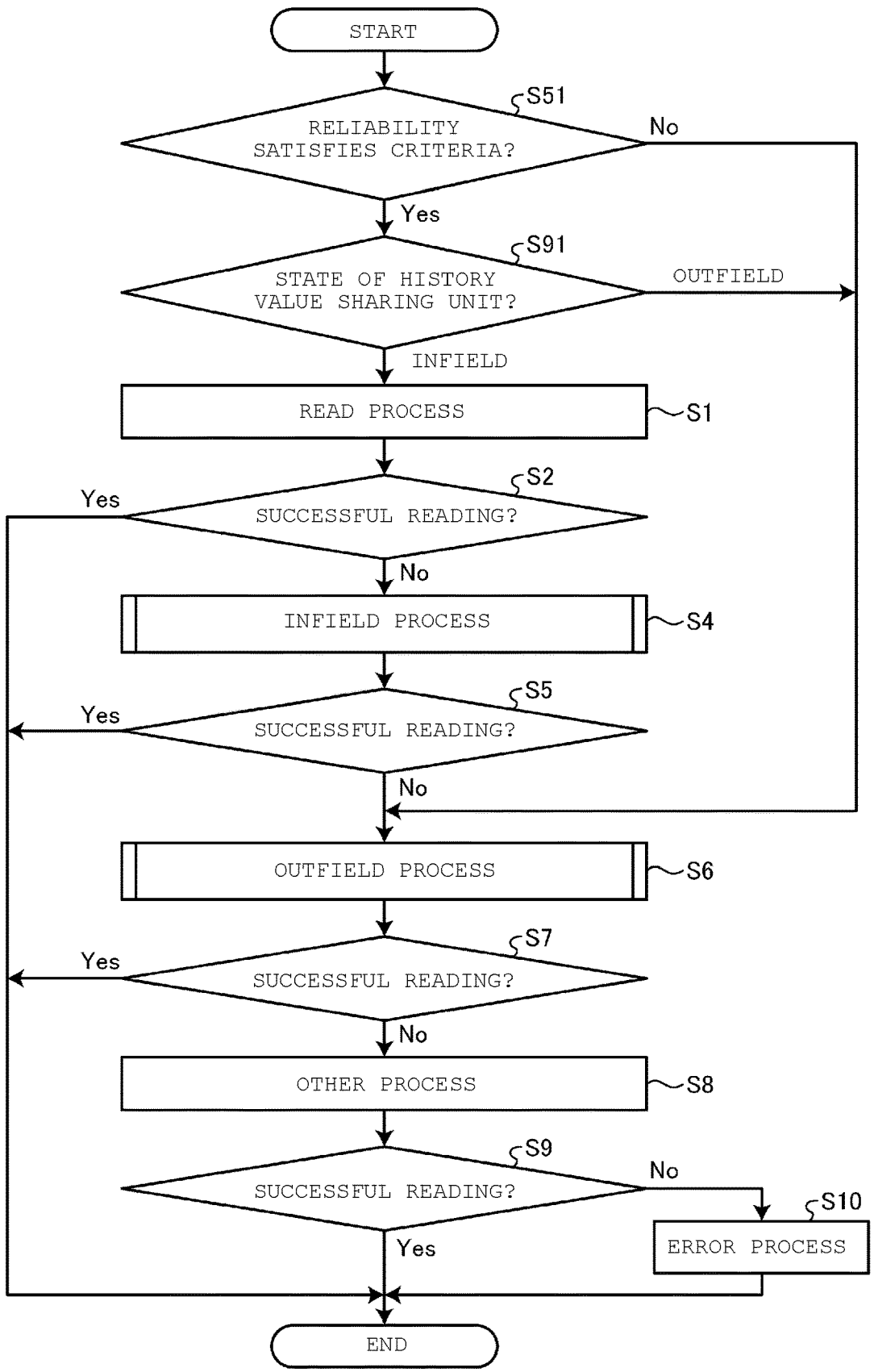
FIG. 20 is a flowchart illustrating an operation of a memory system according to an eighth embodiment.

Based on such consideration, the memory system 1 according to the eighth embodiment executes an operation different from that of the seventh embodiment in the following points as illustrated in FIG. 20. FIG. 20 is a flowchart illustrating an operation of the memory system 1. In the operation illustrated in FIG. 20, the processes of Steps S3 and S81 described with reference to FIG. 19 are omitted, and the processes of Steps S51 and S91 are added before the process of Step S1.

That is, the memory controller 10 determines whether reliability of the target area of the predetermined request satisfies the criteria (S51).

When the reliability of the target area of the predetermined request does not satisfy the criteria (No in S51), the memory controller 10 determines that it is highly likely that reading fails in the read process in its initial stage, omits the read process in the initial stage, and executes the outfield process (S6).

When the reliability of the target area of the predetermined request satisfies the criteria (Yes in S51), the memory controller 10 checks the state of a history value sharing unit corresponding to the target area of the predetermined request (S91).

If the state corresponding to the specified history value sharing unit is an outfield ("outfield" in S91), the memory controller 10 determines that the target area of the predetermined request is appropriate for the outfield process and it is highly likely that reading fails in the read process in the initial stage, omits the read process in the initial stage, and executes the outfield process (S6).

If the state corresponding to the specified history value sharing unit is an infield ("infield" in S91), the memory controller 10 executes the read process in the initial stage according to the predetermined request (S1).

As above, in the memory system 1 according to the eighth embodiment, when reliability of the target area of the predetermined request does not satisfy the criteria, or the state of the history value sharing unit corresponding to the target area of the predetermined request is appropriate for the outfield process, the read process in the initial stage is omitted, and the read retry process (for example, the outfield process) is executed. With this, the efficiency of the operation of the memory system 1 can be further improved.

In the operation illustrated in FIG. 20, the order of Step S51 and Step S91 may be switched.

Ninth Embodiment

Next, a memory system according to a ninth embodiment is described. In the following, portions different from the first to eighth embodiments are mainly described.

In the memory system according to the first to eighth embodiments, history values are updated during the infield process and during the outfield process. In the ninth embodiment, history values are updated in other than the infield process and the outfield process.

For example, the memory controller 10 may update history value according to the result of the patrol read by executing a patrol read for checking the state of a history value sharing unit. This patrol read is a patrol read for updating a history value and is different from normal patrol read for checking the state of the memory cell.

In the patrol read for updating the history value, Vth tracking is executed, and the history value is updated according to the result thereof, and simultaneously the value of the read level is calculated. Reading is executed by using the value of the read level. In the normal patrol read, reading is executed in the normal reading by using the reference value, or reading is executed by using the value of the read level indicated by the history value. The patrol read for updating the history value takes a longer required time than the normal patrol reading.

It is difficult for the memory system 1 to process read requests from the host 30 while executing the patrol read for updating the history values. If the patrol read for updating the history values is executed for all history value sharing units in the memory cell array 23, this history value updating process takes a lot of time. Therefore, it is likely that the latency for the read request from the host 30 increases.

Also, in the ninth embodiment, when the area designated by the patrol read request for updating the history value (for example, history value sharing unit) is appropriate for the outfield process, the memory controller 10 executes the patrol read process for updating the history value which is appropriate for the outfield process and updates the history value in the history value management information according to the execution result. When the area designated by the patrol read request for updating the history value (for example, the history value sharing unit) is appropriate for the infield process, the memory controller 10 skips executing the patrol read process for updating the history value.

Figure 21:
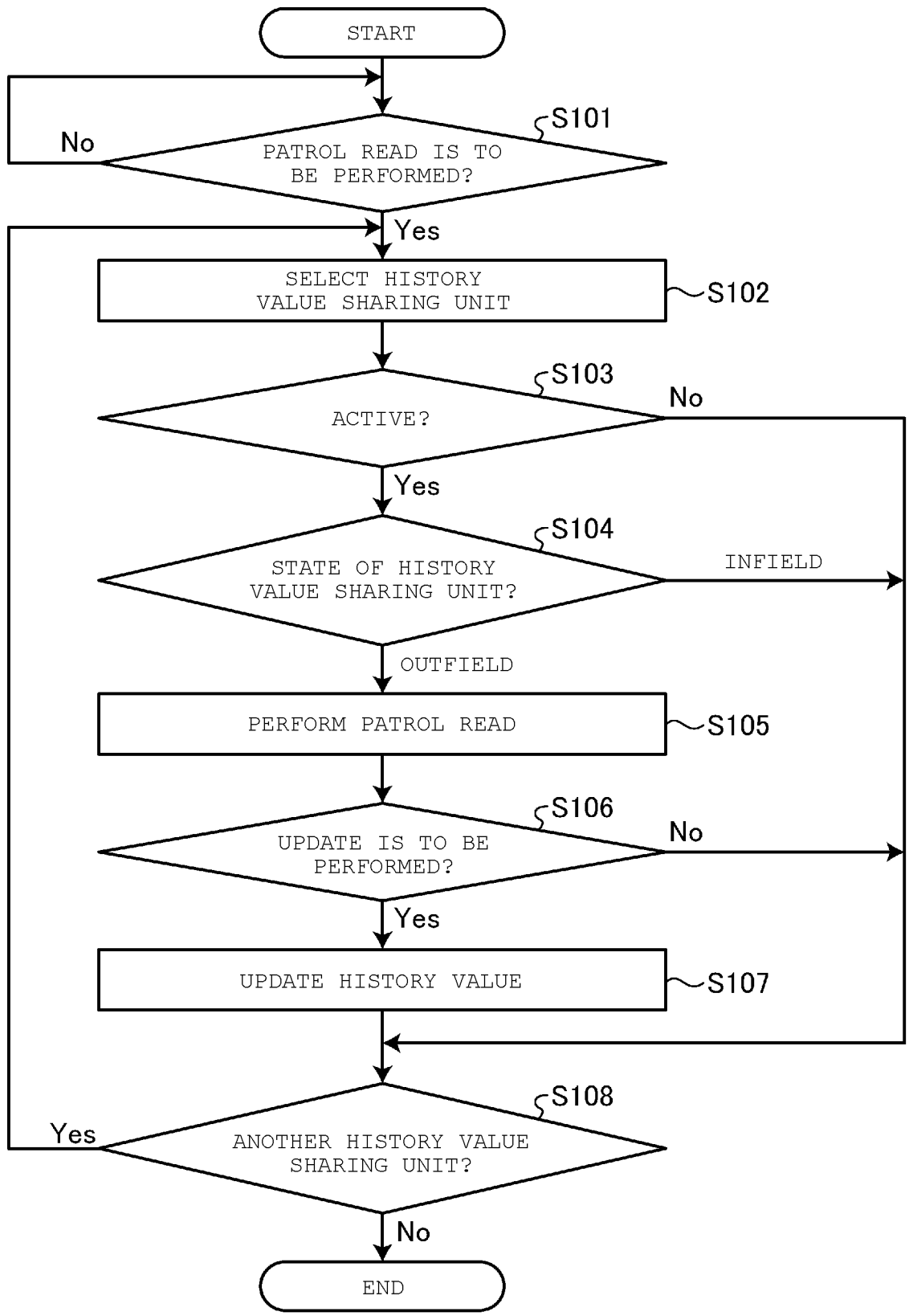
FIG. 21 is a flowchart illustrating an operation of a memory system according to a ninth embodiment.

The memory system 1 executes an operation as illustrated in FIG. 21. FIG. 21 is a flowchart illustrating the operation of the memory system 1.

In the memory system 1, the memory controller 10 determines whether the patrol read for updating the history value is to be executed (S101). The memory controller 10 stands by until a predetermined condition is satisfied (No in S101). The predetermined condition may be elapse of a predetermined period from the execution of the previous patrol read for updating the history value or may be the number of error bits (or fail bit count) in one or more history value sharing units exceeding a threshold. Otherwise, when error correction is a method involving iterative correction (for example, LDPC method), the predetermined condition may be that the number of times of the iteration of error correction exceeds a threshold number of times. Otherwise, the predetermined condition may be that error correction fails in a state where the error correction ability is reduced compared with that at the time of host reading.

When the predetermined condition is satisfied (Yes in S101), the memory controller 10 selects one history value sharing unit where the patrol read for updating the history value has not been executed from the plurality of history value sharing units included in the memory cell array 23 (S102). The memory controller 10 generates the patrol read request for updating the history value that designates the history value sharing unit as an internal process request. The memory controller 10 checks whether the history value sharing unit designated by the patrol read request for updating the history value is active (S103). For example, the memory controller 10 checks whether the area of the unit of an erase operation in the history value sharing unit (for example, a superblock) is active.

Whether the area of the unit of the erase operation is in an active state can be managed by block management information, for example, illustrated in FIG. 22. FIG. 22 is a diagram illustrating the block management information. In FIG. 22, a case where the block management information is implemented in a table format is exemplified. In the block management table, a block identifier and the state are associated for a plurality of superblocks. The block identifier is information for identifying the superblock from other superblocks. The state is information related to the state of the superblock and includes active or non-active. The active state indicates that the superblock is writable. The non-active state indicates that the superblock is not writable. The state may be initially active. For example, when user data cannot be restored, the memory controller 10 may register the superblock in which the user data is stored to the block management information as non-active.

The memory controller 10 may store the block management table in the management information storing area of the memory cell array 23. According to the start-up of the memory system 1 or the like, the memory controller 10 may read the block management table from the management information storing area, store the block management table in the RAM 14, and update the block management table on the RAM 14. The memory controller 10 acquires the block management table from the RAM 14 at a predetermined timing and stores the table in the management information storing area of the memory cell array 23. As a result, the block management table is made nonvolatile.

The block management table illustrated in FIG. 22 indicates that superblocks SBLK1, SBLK4, SBLK5, and SBLK6 are active, and superblocks SBLK2 and SBLK3 are non-active.

The description refers back to FIG. 21. If the area of the unit of the erase operation in which the history value sharing unit is included is non-active (No in S103), the memory controller 10 determines that the history value update is not necessary, and the process proceeds to Step S108.

If the area of the unit of the erase operation in which the history value sharing unit is included is active (Yes in S103), the memory controller 10 determines that it is likely that the history value is to be updated and checks the state of the history value sharing unit related to the reliability (S104). The memory controller 10 accesses the history value sharing management information (for example, the history value sharing management table illustrated in FIG. 5) on the RAM 14.

If the state corresponding to the history value sharing unit is an outfield ("outfield" in S104), the memory controller 10 determines that it is likely that the history value is to be updated, and executes the patrol read process for updating the history value (S105). The memory controller 10 executes Vth tracking, calculates the value of the read level according to the result thereof, and controls the nonvolatile memory 20 so that reading is executed by using the value of the read level.

The memory controller 10 receives the read data from the nonvolatile memory 20 as the result of the patrol read process for updating the history value. The memory controller 10 determines whether the history value is to be updated according to the result of the patrol read process for updating the history value (S106).

If the history value of the history value sharing unit to be processed is a shift index for an infield process or an outfield process, the memory controller 10 accesses the history value management information (for example, the history value management table illustrated in FIG. 6, FIG. 13, or FIG. 16) on the RAM 14 and the shift table (for example, the shift table illustrated in FIG. 9 or FIG. 14). According to the history value management information and the shift table, the memory controller 10 specifies the read level indicated by the current shift index. For example, if the history value sharing unit to be processed is HVSU2 illustrated in FIG. 6, the memory controller 10 specifies a read level $V_3$ from the current shift index Index #3. For example, if the history value sharing unit to be processed is HVSU3 illustrated in FIG. 16, the memory controller 10 specifies a read level $V_{12}$ indicated by the current shift index Index #12.

If the history value of the history value sharing unit to be processed is the value of the read level for the outfield process, the memory controller 10 accesses the history value management information (for example, the history value management table illustrated in FIG. 6) on the RAM 14. According to the history value management information, the memory controller 10 specifies the current value of the read level. For example, if the history value sharing unit to be processed is HVSU1 illustrated in FIG. 6, the memory controller 10 specifies Vth1 as the current value of the read level.

The memory controller 10 may compare the value of the read level generated in Step S105 with (A) the value of the read level indicated by the shift index for the current infield process or the current outfield process, or (B) the value of the read level for the current outfield process, and determine whether the history value is to be updated according to the comparison result. For example, the memory controller 10 may calculate a difference ΔVread of the read levels, determine that the history value is to be updated if the difference ΔVread is a threshold or more (Yes in S106), and determine that the history value is not to be updated if the difference ΔVread is less than the threshold (No in S106).

When the history value is to be updated (Yes in S106), the memory controller 10 updates the history value to the value corresponding to the result of Step S105 (S107).

If the history value of the history value sharing unit to be processed is the shift index for the infield process or for the outfield process, the memory controller 10 accesses the shift table on the RAM 14 and specifies the shift index that is the closest to the value of the read level Vth generated in Step S105. The memory controller 10 accesses the history value management information on the RAM 14. The memory controller 10 over-writes and updates the shift index corresponding to the history value sharing unit in the history value management table with the specified shift index.

If the history value of the history value sharing unit to be processed is the value of the read level for the outfield process, the memory controller 10 accesses the history value management information on the RAM 14. The memory controller 10 over-writes and updates the value of the read level corresponding to the history value sharing unit in the history value management table with the value of the read level obtained in Step S105.

Meanwhile, the memory controller 10 determines that the history value update is not necessary if the state corresponding to the history value sharing unit is an infield ("infield" in S104), skips the execution of the patrol read process for updating the history value (S105), and proceeds to Step S108.

If there is an unprocessed history value sharing unit among the plurality of history value sharing units included in the memory cell array 23 (Yes in S108), the memory controller 10 returns to Step S102, and if there is not an unprocessed history value sharing unit (No in S108), the memory controller 10 ends the process.

Figure 23A:
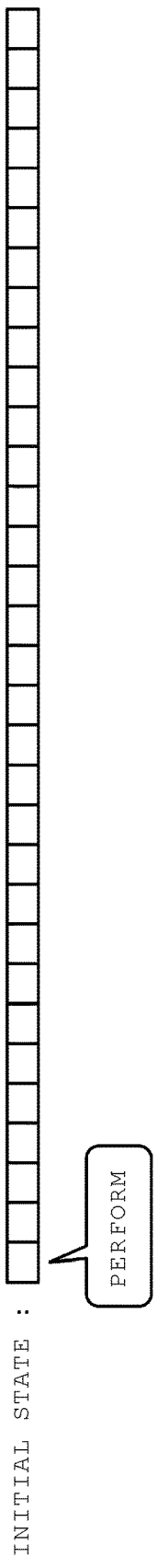
FIGS. 23A and 23B are diagrams illustrating an operation of the memory system according to the ninth embodiment.
Figure 23B:
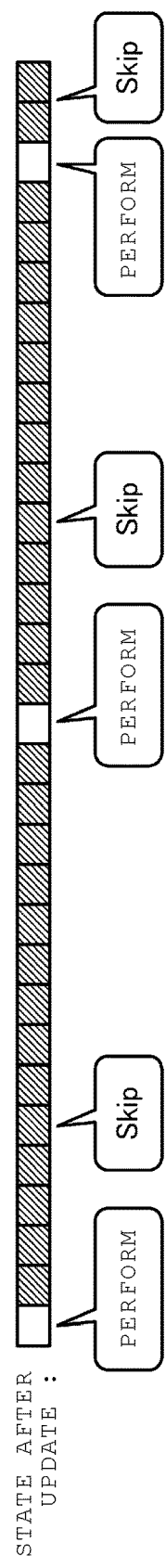
Figure 23B:

As illustrated in FIG. 23B, the memory controller 10 can skip a patrol read process for updating history values for the history value sharing units indicated by diagonal hatching among the plurality of history value sharing units included in the memory cell array 23. The history value sharing unit indicated by diagonal hatching is a history value sharing unit that is in an infield state or a non-active state. As a result, compared to the case where the patrol read process for updating history values is executed for all the history value sharing units as illustrated in FIG. 23A, the memory system 1 can reduce the total processing time of the patrol read process for updating the history value as illustrated in FIG. 23B.

As above, in the memory system 1 according to the ninth embodiment, when the area designated by the patrol read request for updating the history value (for example, the history value sharing unit) is appropriate for the outfield process, the memory controller 10 executes the patrol read process for updating the history value that is appropriate for the outfield process and updates the history value in the history value management information according to the execution result. When the area designated by the patrol read request for updating the history value (for example, the history value sharing unit) is appropriate for the infield process, the memory controller 10 skips the execution of the patrol read process for updating the history value. As a result, total processing time of the patrol read process for updating the history value in the memory system 1 can be reduced, and the latency for a read request from the host 30 can be reduced. Therefore, the performance of the memory system 1 can be improved.

In the operation illustrated in FIG. 21, the order of Step S103 and Step S104 may be switched.

Tenth Embodiment

Next, a memory system according to a tenth embodiment is described. In the following, portions different from the first to ninth embodiments are mainly described.

In the memory system according to the ninth embodiment, when the area designated by the patrol read request for updating the history value is appropriate for the infield process, the execution of the patrol read process for updating the history value is skipped. In the tenth embodiment, when the area designated by the patrol read request for updating the history value is appropriate for the outfield process, the execution of the patrol read process for updating the history value is skipped.

Figure 24:
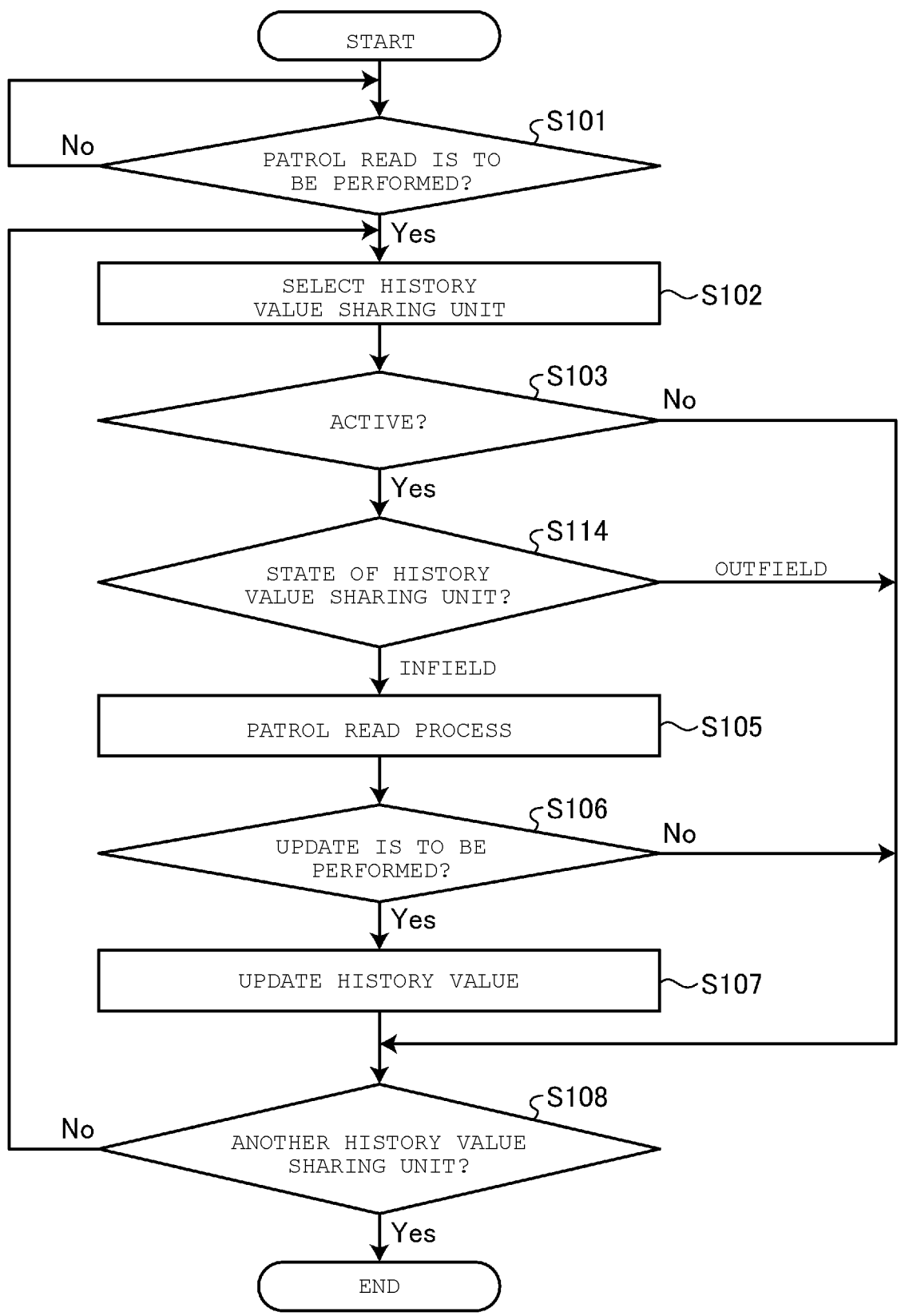
FIG. 24 is a flowchart illustrating an operation of a memory system according to a tenth embodiment.

For example, the memory system 1 executes an operation different from that of the ninth embodiment as illustrated in FIG. 24 in the following points. FIG. 24 is a flowchart illustrating an operation of the memory system 1. In the operation illustrated in FIG. 24, the process of Step S114 is executed instead of the process of Step S104 described with reference to FIG. 21.

If the area of the unit of the erase operation in the history value sharing unit is active (Yes in S103), the memory controller 10 determines that it is likely that the history value is to be updated, and checks the state of the history value sharing unit related to the reliability (S114).

If the state corresponding to the history value sharing unit is an infield ("infield" in S114), the memory controller 10 determines that it is likely that the history value is to be updated and executes the patrol read process for updating the history value (S105).

Meanwhile, when the state corresponding to the history value sharing unit is an outfield ("outfield" in S114), the memory controller 10 determines that the history value update is not necessary, skips the execution of the patrol read process for updating the history value (S105), and proceeds the process to Step S108.

Other points are the same as those in the ninth embodiment.

As illustrated in FIG. 25B, the memory controller 10 can skip a patrol read process for updating history values on the history value sharing units indicated by diagonal hatching among the plurality of history value sharing units in the memory cell array 23. The history value sharing unit indicated by diagonal hatching is a history value sharing unit that is in an outfield state or a non-active state. Therefore, compared with a case where the patrol read process for updating the history value to the entire history value sharing units is executed as illustrated in FIG. 25A, the memory system 1 can reduce the total processing time of the patrol read process for updating the history value as illustrated in FIG. 25B.

As above, in the tenth embodiment, the same effect as in the ninth embodiment is obtained.

In the operation illustrated in FIG. 24, the order of Step S103 and Step S114 may be switched.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
    a nonvolatile memory; and
    a controller configured to:
        select a first one of a plurality of read retry processes having a first average required time when reliability of a target area of the nonvolatile memory on which a read process is to be executed satisfies a criteria, the first one of the plurality of read retry processes including at least a shift read operation, the shift read operation including a plurality of read operations on the target area respectively using different read voltages and an error correction processes for each of the plurality of read operations, based on a shift table that specifies the different read voltages and an order of the different read voltages to be used;
        select a second one of the plurality of read retry processes having a second average required time that is longer than the first average required time when the reliability of the target area does not satisfy the criteria, the second one of the plurality of read retry processes including at least a tracking operation that is executed before any one of the plurality of read operations of the shift read operation, the tracking operation including a plurality of single-level read operations in each of which the number of memory cells that turn on is counted; and
        execute the selected read retry process.

2. The memory system according to claim 1,
    wherein the controller is configured to determine whether the reliability of the target area satisfies the criteria based on an indicator showing characteristics of an area of the nonvolatile memory, wherein the area is larger than the target area and includes the target area.

3. The memory system according to claim 1,
    wherein the controller is configured to determine whether the reliability of the target area satisfies the criteria based on an indicator showing characteristics of an area of the nonvolatile memory, wherein the area is smaller than the target area and is part of the target area.

4. The memory system according to claim 1,
    wherein the controller is configured to (i) select the first one of the plurality of read retry processes when the number of write-and-erase cycles of the target area is smaller than a first threshold and (ii) select the second one of the plurality of read retry processes when the number of write-and-erase cycles of the target area is larger than the first threshold.

5. The memory system according to claim 1,
    wherein the controller is configured to (i) select the first one of the plurality of read retry processes when the number of times of reading of the target area is smaller than a second threshold and (ii) select the second one of the plurality of read retry processes when the number of times of reading of the target area is larger than the second threshold.

6. The memory system according to claim 1,
    wherein the controller is configured to (i) select the first one of the plurality of read retry processes when a refresh operation for rewriting data of a first block including the target area to a second block is performed according to elapse of a predetermined period and (ii) select the second one of the plurality of read retry processes when the refresh operation is performed before elapse of the predetermined period.

7. The memory system according to claim 1,
    wherein the controller is configured to (i) select the first one of the plurality of read retry processes when a time interval of a refresh operation for rewriting data of a first block including the target area to a second block is larger than a third threshold and (ii) select the second one of the plurality of read retry processes when a time interval of the refresh operation is smaller than the third threshold.

8. The memory system according to claim 1,
    wherein the controller is configured to (i) select the first one of the plurality of read retry processes when an error correction ability to correct an error in data stored in the target area is a first correction ability and (ii) select the second one of the plurality of read retry processes when the error correction ability to correct the error in the data stored in the target area is a second correction ability lower than the first correction ability.

9. The memory system according to claim 1,
    wherein the controller is configured to (i) select the first one of the plurality of read retry processes when temperature during writing in the target area is higher than a fourth threshold and (ii) select the second one of the plurality of read retry processes when temperature during writing in the target area is lower than the fourth threshold.

10. The memory system according to claim 1,
    wherein the controller is configured to (i) select the first one of the plurality of read retry processes when a word line corresponding to a memory cell including the target area exists at a first position in a block and (ii) select the second one of the plurality of read retry processes when the word line exists at a second position closer to an end of the block than the first position in the block.

11. The memory system according to claim 1,
wherein the controller is configured to (i) select the first one of the plurality of read retry processes when elapse time from start-up of the memory system is longer than a fifth threshold and (ii) select the second one of the plurality of read retry processes when elapse time from start-up of the memory system is shorter than the fifth threshold.

12. A method of controlling a nonvolatile memory, comprising:
selecting a first one of a plurality of read retry processes having a first average required time when reliability of a target area of the nonvolatile memory on which a read process is to be executed satisfies a criteria, the first one of the plurality of read retry processes including at least a shift read operation, the shift read operation including a plurality of read operations on the target area respectively using different read voltages and an error correction processes for each of the plurality of read operations, based on a shift table that specifies the different read voltages and an order of the different read voltages to be used;
selecting a second one of the plurality of read retry processes having a second average required time that is longer than the first average required time when the reliability of the target area does not satisfy the criteria, the second one of the plurality of read retry processes including at least a tracking operation that is executed before any one of the plurality of read operations of the shift read operation, the tracking operation including a plurality of single-level read operations in each of which the number of memory cells that turn on is counted; and
executing the selected read retry process.

13. The method according to claim 12,
wherein whether the reliability of the target area satisfies the criteria is determined based on an indicator showing characteristics of an area of the nonvolatile memory, wherein the area is larger than the target area and includes the target area.

14. The method according to claim 12,
wherein whether the reliability of the target area satisfies the criteria is determined based on an indicator showing characteristics of an area of the nonvolatile memory, wherein the area is smaller than the target area and is part of the target area.

15. A controller connectable to a nonvolatile memory, comprising:
a circuit configured to:
select a first one of a plurality of read retry processes having a first average required time when reliability of a target area of the nonvolatile memory on which a read process is to be executed satisfies a criteria, the first one of the plurality of read retry processes including at least a shift read operation, the shift read operation including a plurality of read operations on the target area respectively using different read voltages and an error correction processes for each of the plurality of read operations, based on a shift table that specifies the different read voltages and an order of the different read voltages to be used;
select a second one of the plurality of read retry processes having a second average required time that is longer than the first average required time when the reliability of the target area does not satisfy the criteria, the second one of the plurality of read retry processes including at least a tracking operation that is executed before any one of the plurality of read operations of the shift read operation, the tracking operation including a plurality of single-level read operations in each of which the number of memory cells that turn on is counted; and
execute the selected read retry process.

16. The controller according to claim 15,
wherein the circuit is configured to determine whether the reliability of the target area satisfies the criteria based on an indicator showing characteristics of an area of the nonvolatile memory, wherein the area is larger than the target area and includes the target area.

17. The controller according to claim 15,
wherein the circuit is configured to determine whether the reliability of the target area satisfies the criteria based on an indicator showing characteristics of an area of the nonvolatile memory, wherein the area is smaller than the target area and is part of the target area.

* * * * *